United States Patent [19]

Flamme et al.

[11] Patent Number: 6,070,538

[45] Date of Patent: Jun. 6, 2000

[54] MODULAR AGRICULTURAL IMPLEMENT CONTROL SYSTEM

[75] Inventors: David D. Flamme, Hinsdale; Abraham Orbach, Naperville; Paul W. Haack, Crystal Lake; Eric D. Jacobson, Downers Grove, all of Ill.

[73] Assignee: Case Corporation, Racine, Wis.

[21] Appl. No.: 08/935,411

[22] Filed: Sep. 23, 1997

Related U.S. Application Data

[63] Continuation-in-part of application No. 08/753,335, Nov. 22, 1996, Pat. No. 5,878,371.

[51] Int. Cl.⁷ ..................................................... A01C 7/00
[52] U.S. Cl. ............................ 111/170; 111/903; 701/50; 340/684; 340/674; 702/5
[58] Field of Search ........................... 172/2–7; 111/900, 111/200, 903, 904, 170, 186, 187, 188, 118, 120, 127, 129, 80; 364/510; 340/674, 673, 684; 701/58; 702/2, 3, 5

[56] References Cited

U.S. PATENT DOCUMENTS

| | | |
|---|---|---|
| 3,762,603 | 10/1973 | Bauman et al. . |
| 3,848,552 | 11/1974 | Bauman et al. . |
| 3,855,953 | 12/1974 | Fathauer et al. ............................ 111/1 |
| 3,860,146 | 1/1975 | Bauman et al. . |
| 3,885,704 | 5/1975 | Lienemann et al. . |
| 4,013,875 | 3/1977 | McGlynn . |
| 4,148,414 | 4/1979 | Parks, Jr. . |
| 4,268,825 | 5/1981 | Kaplan .................................... 340/684 |
| 4,296,409 | 10/1981 | Whitaker et al. . |
| 4,333,096 | 6/1982 | Jenkins et al. . |
| 4,365,672 | 12/1982 | Robinson, Jr. et al. . |
| 4,381,036 | 4/1983 | Fardal et al. . |
| 4,413,685 | 11/1983 | Gremelspacher et al. . |
| 4,467,872 | 8/1984 | Hodapp . |
| 4,488,476 | 12/1984 | Diel et al. . |
| 4,523,280 | 6/1985 | Bachman . |
| 4,530,463 | 7/1985 | Hiniker et al. . |
| 4,653,410 | 3/1987 | Typpi . |
| 4,721,168 | 1/1988 | Kinzenbaw . |
| 4,747,301 | 5/1988 | Bellanger . |
| 4,803,626 | 2/1989 | Bachman et al. . |

(List continued on next page.)

OTHER PUBLICATIONS

Operators Manual, 955 Planter Cyclo Air 12/23 Solid Row Crop Front Fold, Rac 9–29280, Case Corporation, Dec. 1996, 14 excerpts.

Drills 5400 and 5500 Soybean Special Pamphlet, No. AE 174086, Case Corporation, 1996, 1 page.

Early Riser 955 Series Cyclo Air Planters Pamphlet, No. AE 17086, Case Corporation, 1996, 1 page.

Early Riser Cyclo Air and Plate Planters, RC Cultivators and Hoes Pamphlet, No. AE 101055, Case Corporation, 1995, 2 pages.

*Primary Examiner*—Victor Batson
*Attorney, Agent, or Firm*—Foley & Lardner

[57] ABSTRACT

A control system for agricultural implements such as planters, conventional or air drills is disclosed herein. The implement includes a frame with one or more sections. Each section supports a plurality of row units configured to apply a product at variable rates to rows in a field. The products can include seeds, fertilizers, insecticides and herbicides. In one configuration, the control system monitors the rates at which the product is applied to the rows. This configuration of the control system includes sensors configured to sense the rates at which product is applied, and a control module configured to monitor the sensed rates and generate a multiplexed output signal representative thereof. The output signal is used, for example, by a cab-mounted display or recording device. The control system, however, can be reconfigured to both monitor and control the application rates by installing a second control module on the frame. The second control module generates rate control signals in response to rate command input signals. The rate control signals are applied to the metering device to cause the metering device to meter product to the row units at the commanded rates. Commanded rates are set, for example, by a cab-mounted display control module.

20 Claims, 31 Drawing Sheets

U.S. PATENT DOCUMENTS

| | | |
|---|---|---|
| 5,025,951 | 6/1991 | Hook et al. . |
| 5,220,876 | 6/1993 | Monson et al. . |
| 5,232,054 | 8/1993 | Van Blaricon et al. . |
| 5,260,875 | 11/1993 | Tofte et al. . |
| 5,323,721 | 6/1994 | Tofte et al. ............................ 111/200 |
| 5,424,957 | 6/1995 | Kerkhoff et al. . |
| 5,431,117 | 7/1995 | Steffens et al. . |
| 5,488,817 | 2/1996 | Paquet et al. . |
| 5,498,929 | 3/1996 | Formwalt, Jr. . |
| 5,574,657 | 11/1996 | Tofte et al. . |
| 5,581,235 | 12/1996 | Hollstein . |
| 5,598,794 | 2/1997 | Harms et al. . |
| 5,621,666 | 4/1997 | O'Neall et al. . |
| 5,635,911 | 6/1997 | Landers et al. . |
| 5,809,440 | 9/1998 | Beck et al. .............................. 701/50 |
| 5,878,371 | 3/1999 | Hale et al. .................................. 702/5 |

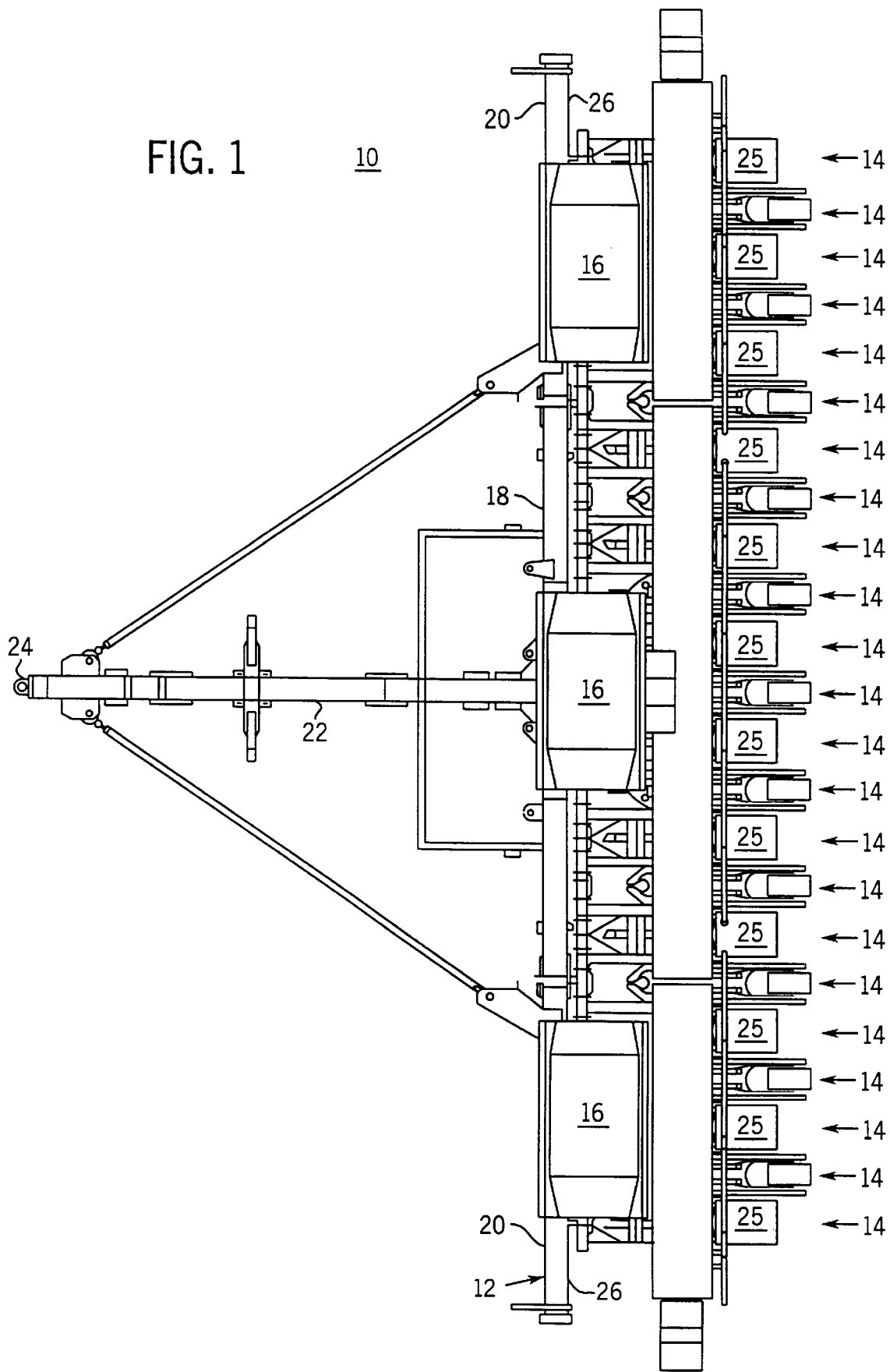

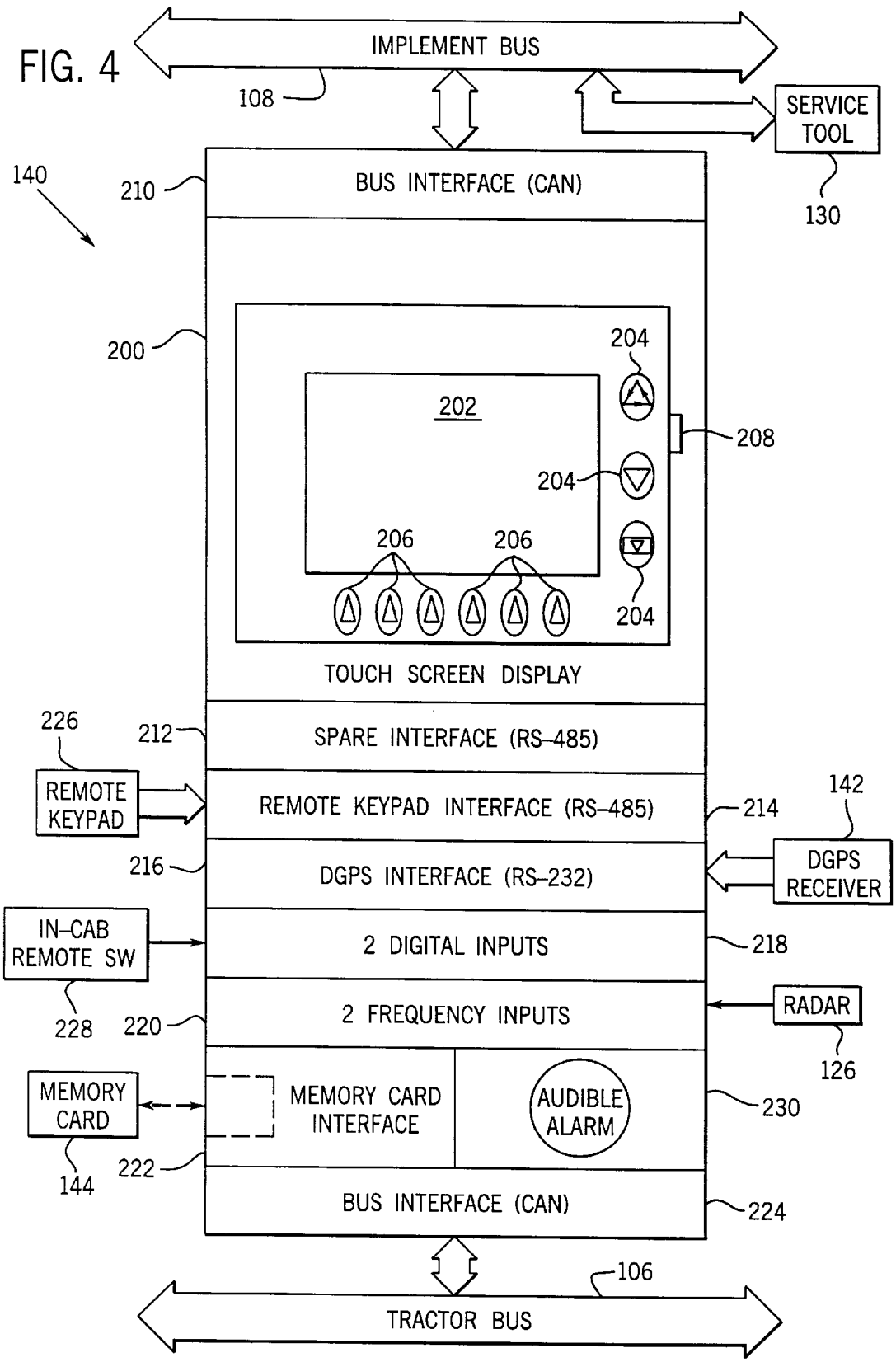

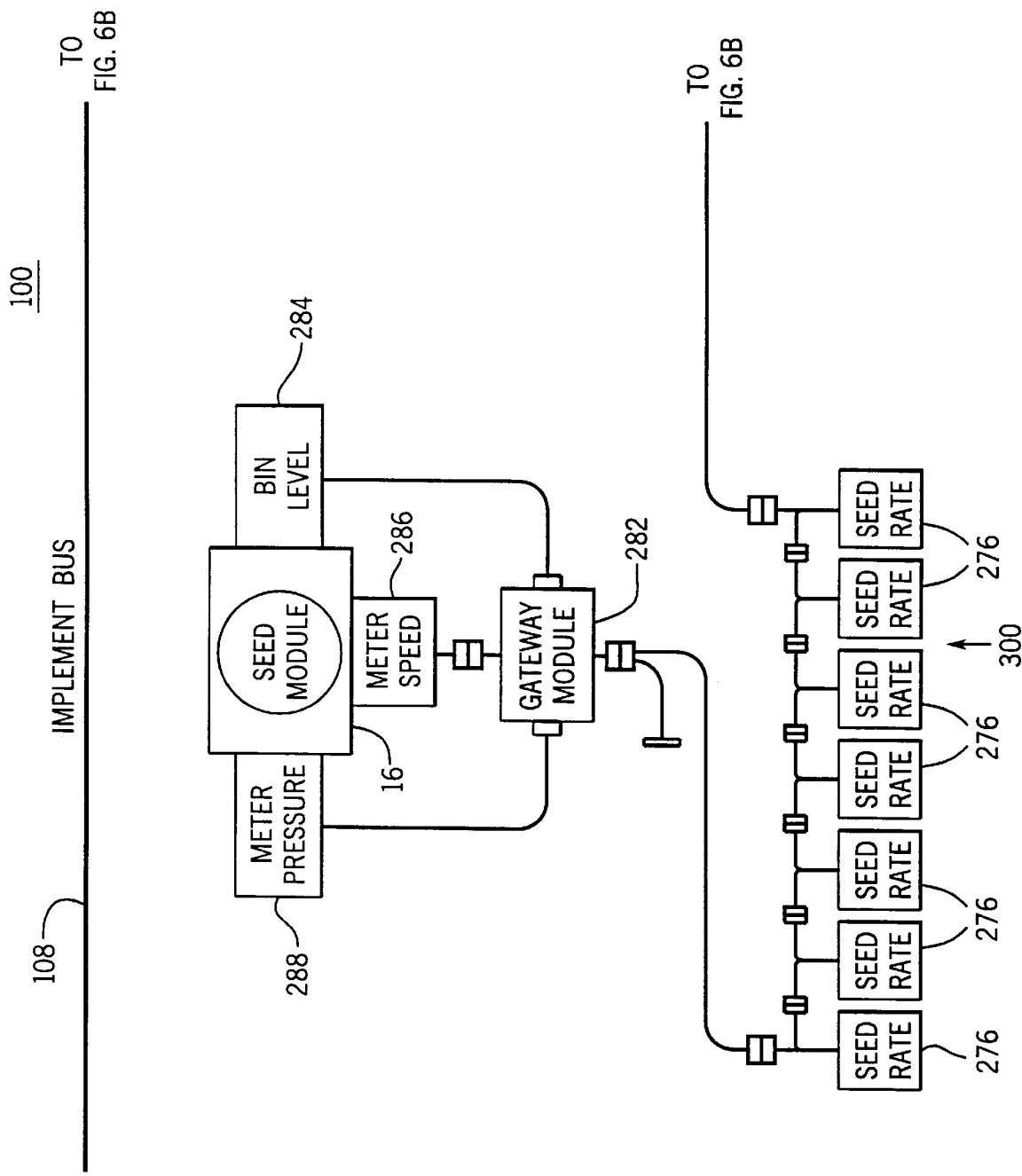

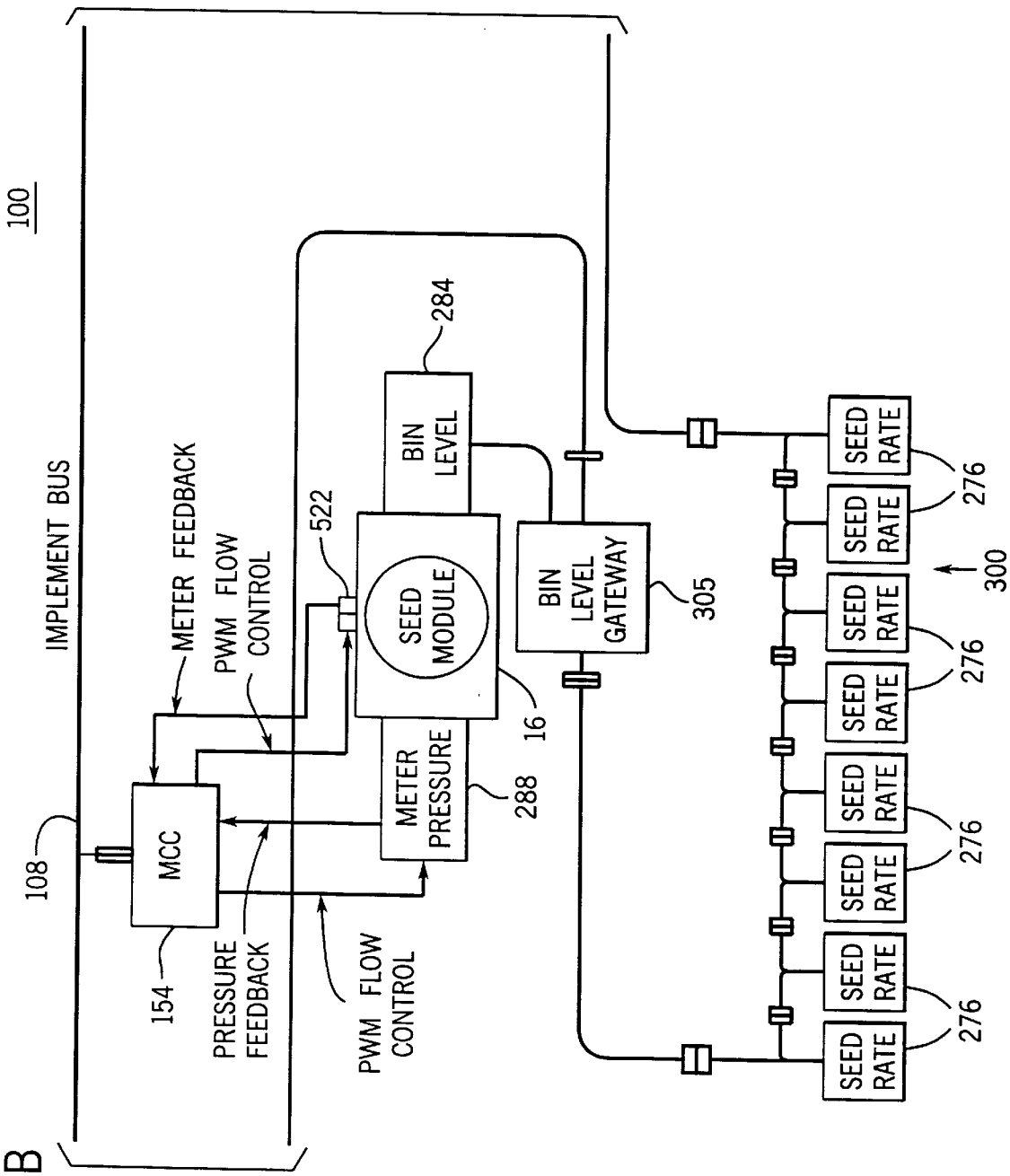

FROM FIG. 17A

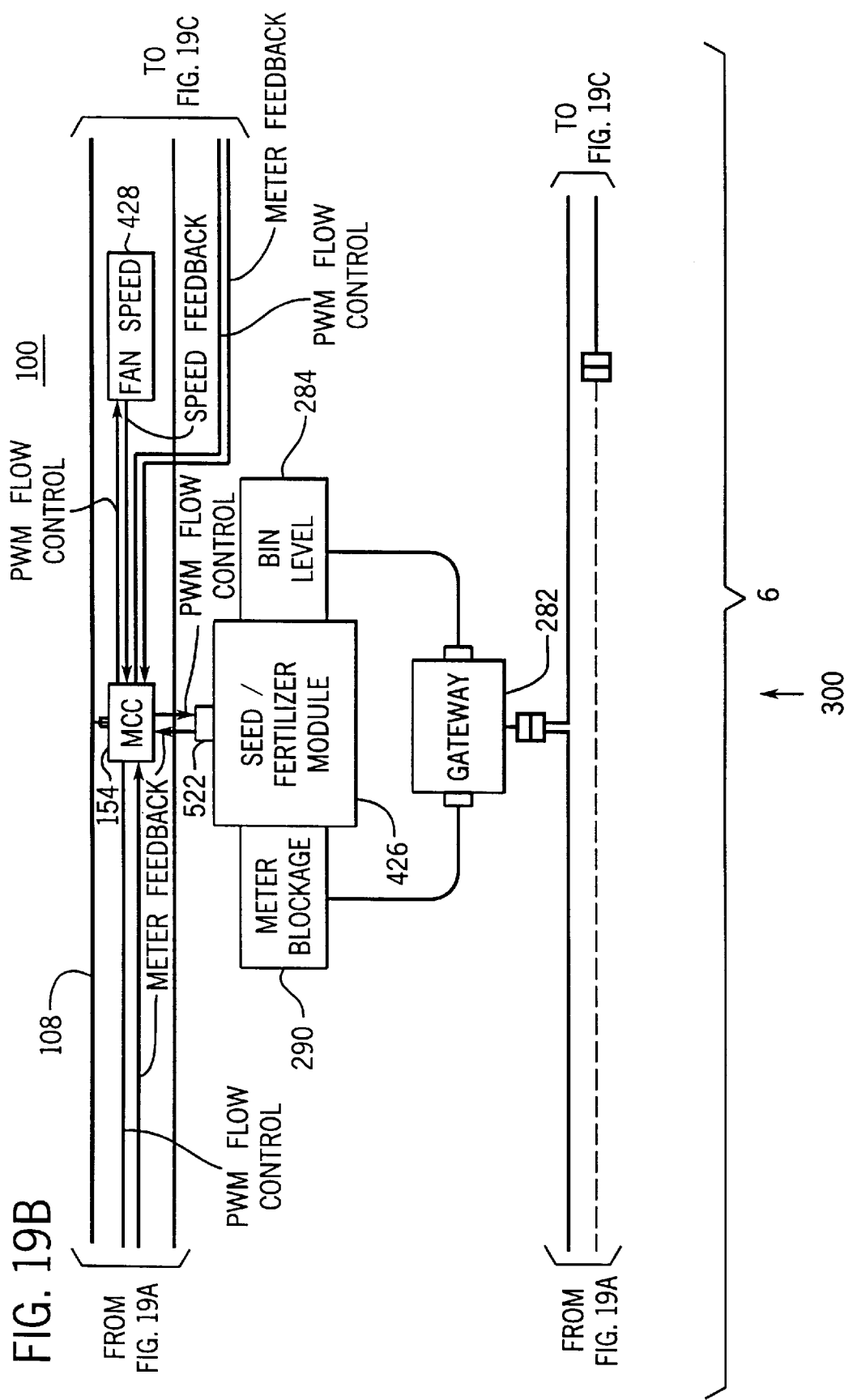

MODULAR AGRICULTURAL IMPLEMENT CONTROL SYSTEM

CROSS-REFERENCE TO RELATED APPLICATION

This application is a continuation-in-part of U.S. Application No. 08/753,335 filed Nov. 22, 1996, entitled "Method and Apparatus For Synthesizing Site-Specific Farming Data", issued on Mar. 2, 1999 to Hale et al. as U.S. Pat. No. 5,878,371.

FIELD OF THE INVENTION

The present invention generally relates to control systems for agricultural implements. In particular, the invention relates to a modular application control system for an implement (e.g., planter, conventional drill, air drill) wherein a first control module monitors the rates at which a product is applied to an agricultural field by a product metering device and a removable second control module controls the application rates of the product.

BACKGROUND OF THE INVENTION

Implements such as planters, conventional drills and air drills are used to plant seed in agricultural fields. Planting implements typically include a frame with one or more sections. Each section supports multiple row units configured to apply seeds to a field as the implement is pulled by a vehicle (e.g., wheeled or tracked tractor). Seeds are stored in one or more seed bins located on or pulled behind the implement. Planters and drills often include systems configured to apply granular or liquid fertilizer, insecticide or herbicide.

Planters include meters configured to dispense or meter individual seeds to row units. Drills use fluted rolls to meter a mass or volume of seed. Metering and placement accuracy is typically higher for planters than drills. Seeds of crop (e.g., corn) requiring relatively accurate metering and placement for efficient growth are typically planted using planters, and seeds of crop which grow efficiently in more varied environments (e.g., oats; wheat) are planted by less accurate and expensive drills.

Many planters and drills are made by Case Corp., the assignee of this invention. For example, the 955 Series EARLY RISER CYCLO AIRS Planters include central-fill seed bins for storing seed, pressurized air metering systems for metering seed, and air distribution systems for delivering seeds to row units. Planters in this series plant different numbers of rows at different row widths. For example, a 12/23 solid row crop (SRC) cyclo planter plants 23 narrow rows or 12 wide rows when every other row unit is locked up. Case Corp. also makes the 900 Series EARLY RISER Plate Planters. Conventional drills include 5300, 5400 and 5500 grain drills which include different numbers of openers, opener spacings and seeding widths. For example, a 5500 Soybean Special Grain Drill has 24 openers, 5 inch spacings and a 30 foot width. A family of Concord air drills is available from Case Corp.

Under conventional agricultural practices, fields are treated (e.g., planted) as having uniform parameters. However, crop production may be optimized by taking into account spatial variations often existing within fields. By varying inputs applied to a field according to local conditions within the field, the yield as a function of the inputs applied can be optimized while environmental damage is prevented or minimized. Farming inputs which have been applied according to local conditions include herbicides, insecticides and fertilizers. The practice of farming according to local field conditions has been called precision, site-specific or prescription farming.

To fully realize the benefits of precision farming, planting implements are needed which can monitor rates at which farming inputs are applied and which can control the rates of application on a site-specific basis. The control requirements for such planting implements would be more sophisticated than for conventional implements. Thus, it would be desirable to have planting implements (e.g., planters, conventional or air drills) equipped with control systems for monitoring rates at which inputs are applied to a field by row units, and for controlling the rates at which metering devices dispense the inputs.

Planting implements further include "global" output devices which perform global implement functions such as frame lighting control, frame position control and marker position control. These global functions are performed for the whole implement, rather than for each section or row unit. Frame lights are controlled to warn following motorists when the implement turns. The frame of the implement is controlled to raise and lower the implement, and to fold and unfold the frame wings. Markers attached to either side of the implement are raised and lowered to indicate the centerline of the next pass through a field.

The current standard for implement frame lighting includes tail lamp, right turn and left turn signal lamps controlled by a three-signal vehicle connector. However, implements will be required to meet an enhanced lighting standard (i.e., ASAE S279) which will include additional enhanced left and right turn signal lamps. The new lamps will enhance the turn warning signals. The enhanced lamps will perform the same functions as the current left and right turn lamps except the opposite turn signal lamp will not light steadily when making a turn. Additionally, neither lamp will flash during a regular transport mode. To accommodate the use of implements compatible with the new standard with today's vehicles, it would be desirable to provide a control system which receives standard lighting signals, converts them to enhanced lighting signals, and uses the enhanced lighting signals to control the enhanced lamps.

It would further be desirable to provide a control system for an implement which provides a central control console for the operator. This console, which would be located at the operator station (e.g., in the cab), would generate global command signals for the global implement functions and rate commands for local product metering devices mounted on each section of the implement. To reduce wiring requirements, it would also be desirable to provide an implement bus running between the cab and the implement for sending global and local commands to the implement, and for receiving monitored feedback signals.

The number of global output devices for performing global implement functions will generally be known since these functions are performed for the whole implement. Thus, the control requirements for a global control unit will be known. An implement, however, can include one, two, three or more sections, with each section having one or more product metering devices. It would be difficult to ascertain the control requirements for a single local implement controller. Thus, it would be desirable to provide a control system for a planting implement wherein one global controller controls global functions, while a plurality of distributed local controllers control the product application rates for the plurality of sections.

The movement from conventional to precision farming practices will take significant time as farmers evaluate the technology, learn to use it, study its economic and environmental costs and benefits, and upgrade equipment. To help make the transition, it would be desirable to provide an implement with a modular control system which can be upgraded over time by adding controllers with added functionality. The initial control system would provide monitoring and global control functions, with application rates being controlled conventionally. Such a control system could then be upgraded to provide variable-rate control capabilities. These capabilities would be controlled manually, or automatically based upon the position of the implement and geo-referenced maps.

SUMMARY OF THE INVENTION

One embodiment of the invention provides a modular application control system for an agricultural implement. The implement includes row units supported by a support structure for applying a product to rows in a field, and a device for metering the product to the row units. The system includes product sensors for sensing the rates at which the product is applied and for generating product signals representative thereof. A first control module supported by the support structure monitors the rates at which the product is applied and generates a multiplexed output signal representative thereof. A second control module supported by the structure generates rate control signals in response to rate command input signals and applies the control signals to the metering device to cause the metering device to meter the product to the row units at commanded rates.

Another embodiment of the invention provides a method of reconfiguring a product application control system for such an implement. The method includes providing a first control module mounted on the support structure for monitoring the rates at which the product is applied using signals generated by product sensors. The method includes attaching a second control module on the support structure to generate rate control signals in response to command signals and to apply the rate control signals to the metering device to cause the metering device to meter the product at commanded rates.

Another embodiment of the invention provides a modular application control system for such an implement coupled to a vehicle including an operator station such as a cab. A data bus provides communication between the operator station and implement. A display control module located in the operator station includes a command device and a display. The display control module transmits rate command signals on the bus in response to actuations of the command device. Sensors sense rates at which the product is applied and generate rate signals therefrom. One control module supported by the support structure monitors the rates at which the product is applied and transmits rate feedback data on the bus to the display control module for display. A second control module supported by the support structure is configured, when installed, to receive the rate command signals from the display control module, generate rate control signals in response thereto, and apply the rate control signals to the metering device to cause the metering device to meter the product to the row units at commanded rates.

Another embodiment of the invention provides a kit for providing variable-rate control when combined with a control system for an implement. The implement includes a support structure, row units supported thereby to apply the product to rows in a field, and a metering device to meter the product to the row units. The control system includes rate sensors for sensing the rates at which the product is applied to the rows and for generating rate signals representative thereof, a meter status sensor for sensing a parameter of the metering device and generating signals representative thereof, and a monitoring control module for monitoring the rates at which the product is applied and the parameter of the metering device. The kit includes a control module removably supported by the support structure for generating rate control signals in response to rate command signals and for applying the rate control signals to the metering device to cause the metering device to meter the product at commanded rates.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a top view of a planting implement (e.g., a 12/23 solid row crop (SRC) cyclo planter);

FIG. 4 is a block diagram of the cab display unit (CDU) of FIG. 3, and the interfaces between the CDU and other components of the control system;

DETAILED DESCRIPTION OF THE PREFERRED EMBODIMENTS

Figure 2A:
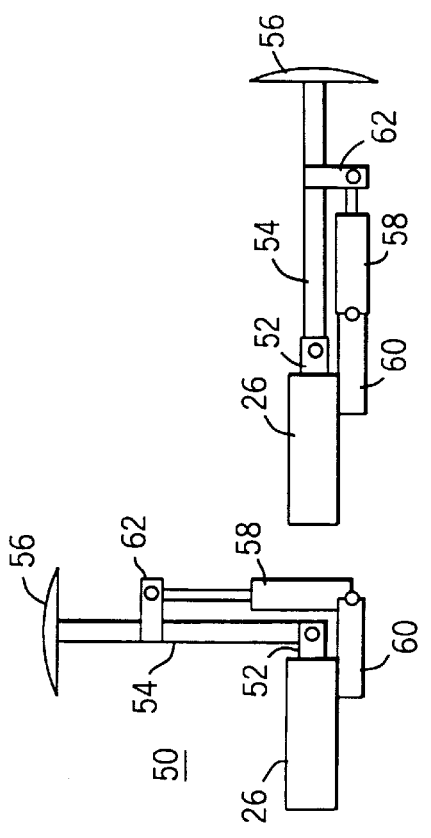
FIG. 2a shows single-stage markers in their fully folded and unfolded states.

Referring to FIG. 1, a planting implement 10 (e.g., 12/23 SRC cyclo planter) is shown. Implement 10 includes a frame 12, row units 14 mounted beneath frame 12, and seed modules 16 supported on frame 12. Frame 12 includes a middle section 18, two wing sections 20 mounted for rotation on either side of section 18, and a drawbar 22 extending forward from section 18. Wing sections 20 are horizontally rotatable in towards drawbar 22 to decrease implement width for transport. An eye 24 extends from drawbar 22 for connection to a vehicle. There are 23 row units 14 configured to plant seed in 23 rows of a field when all 23 row units 14 are down, or in 12 rows when every other row unit 14 is locked up. Each seed module 16 meters seeds for one section. The sections include 8, 8 and 7 row units 14, respectively. The metered seeds travel through seed tubes (not shown) to row units 14. Implement 10 also supports bins 25 storing other products (e.g., fertilizer) along with metering devices therefore.

Figure 2B:
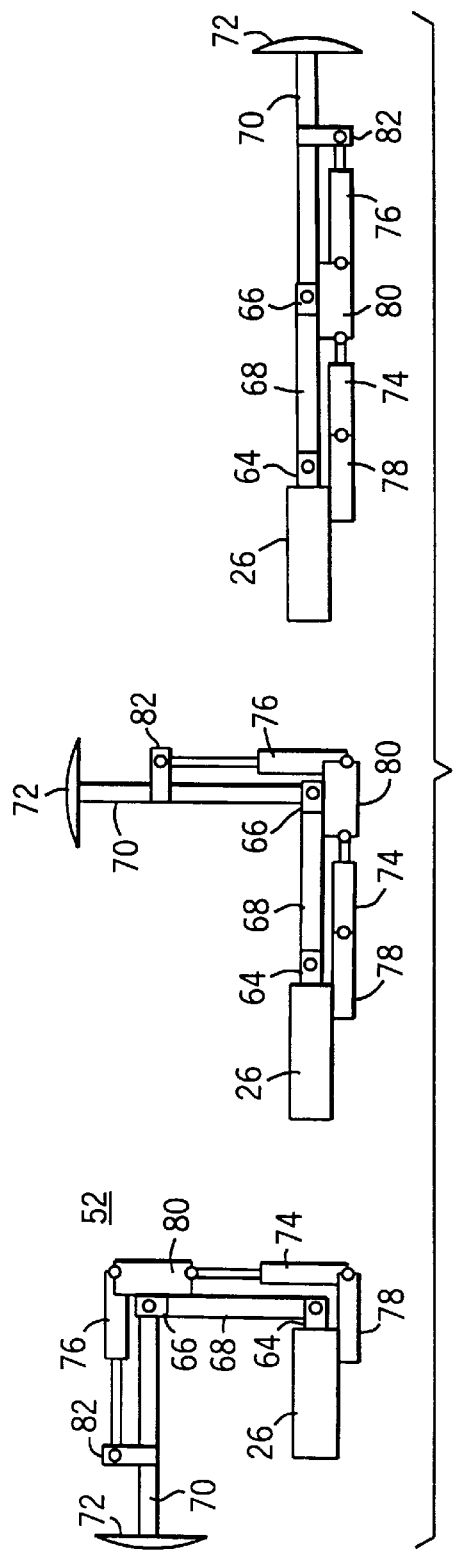
FIG. 2b shows dual-stage markers in their fully, partially and unfolded states.

Referring to FIGS. 1 and 2, markers attached to ends 26 of wing sections 20 on both sides of frame 12 are used to mark the centerline of the next pass through a field. A particular implement may use single-stage markers 50 (FIG. 2a). Other implements, such as the planter, use dual-stage markers 52 (FIG. 2b). FIG. 2a shows single stage marker 50 in its fully folded and unfolded states. Marker 50 includes a pivot assembly 52 mounted to end 26 of wing section 20 and a marker rod 54 connected between assembly 52 and a disk 56. Disk 56 marks the field when marker 50 is unfolded. Marker 50 is actuated by an outer cylinder assembly 58 pivotally coupled between a support member 60 extending from end 26 and a bracket 62 attached to rod 54. Marker 50 is folded when cylinder assembly 58 is extended and unfolded when assembly 58 is retracted.

Referring to FIG. 2b, dual-stage marker 52 is shown in its fully, partially, and unfolded states. Marker 52 includes a first pivot assembly 64 mounted to end 26 of wing section 20, a second pivot assembly 66, and a first marker rod 68 connected between assemblies 64 and 66. A second marker rod 70 is connected between assembly 66 and a marker disk 72. Disk 72 marks the field when marker 52 is unfolded. Marker 52 is actuated by inner and outer cylinder assemblies 74 and 76. Assembly 74 is pivotally coupled between a first support member 78 extending from end 26 and second support member 80 attached to assembly 66. Assembly 76 is pivotally coupled between member 80 and a bracket 82 attached to rod 70. Marker 52 is folded when assemblies 74 and 76 are extended, partially folded with assembly 74 retracted and assembly 76 extended, and unfolded with assemblies 74 and 76 retracted.

Figure 3A:
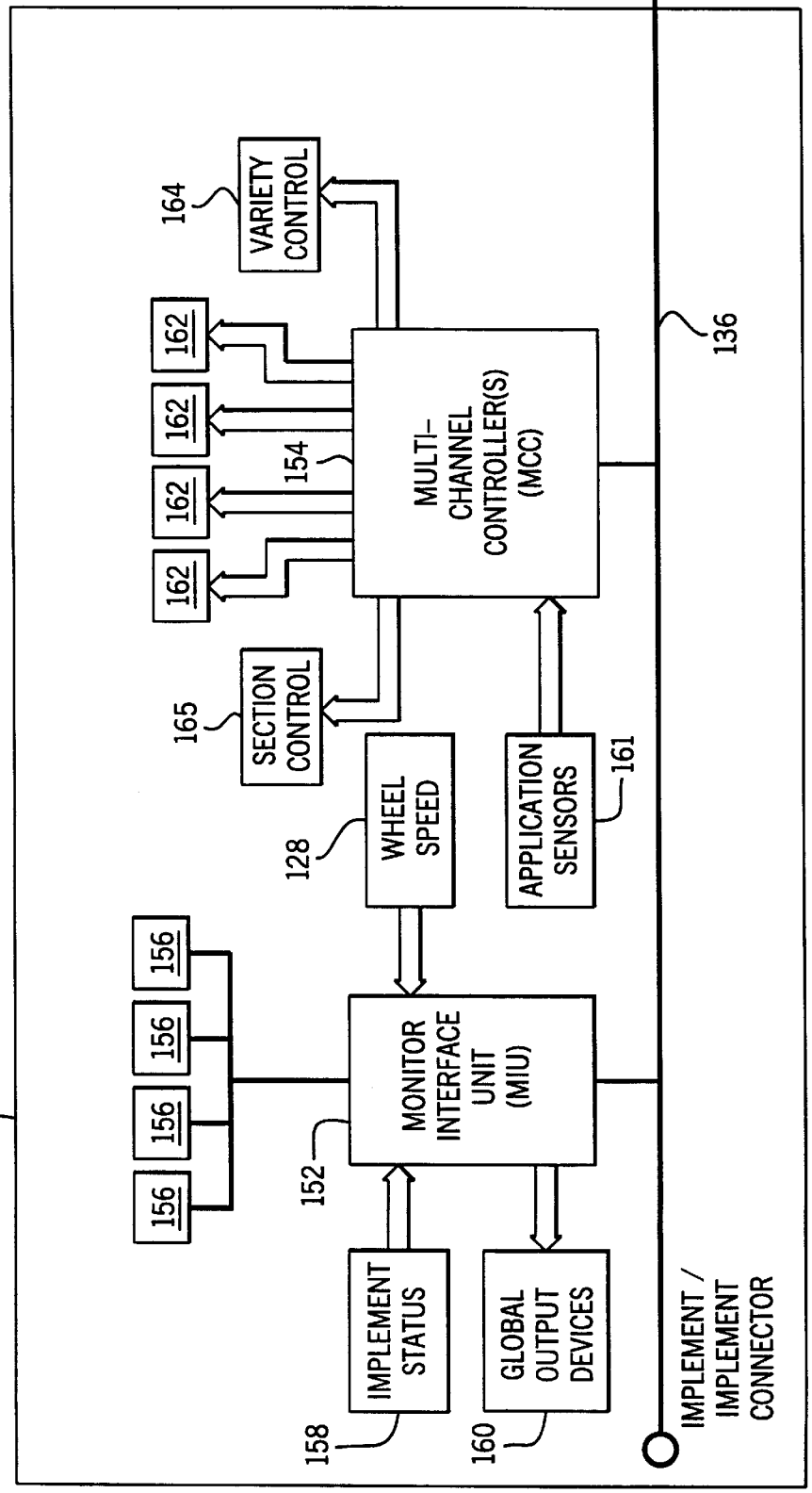
FIG. 3 is a block diagram of the control system for an agricultural work vehicle and planting implement which includes a vehicle data bus and an implement data bus.
Figure 3B:
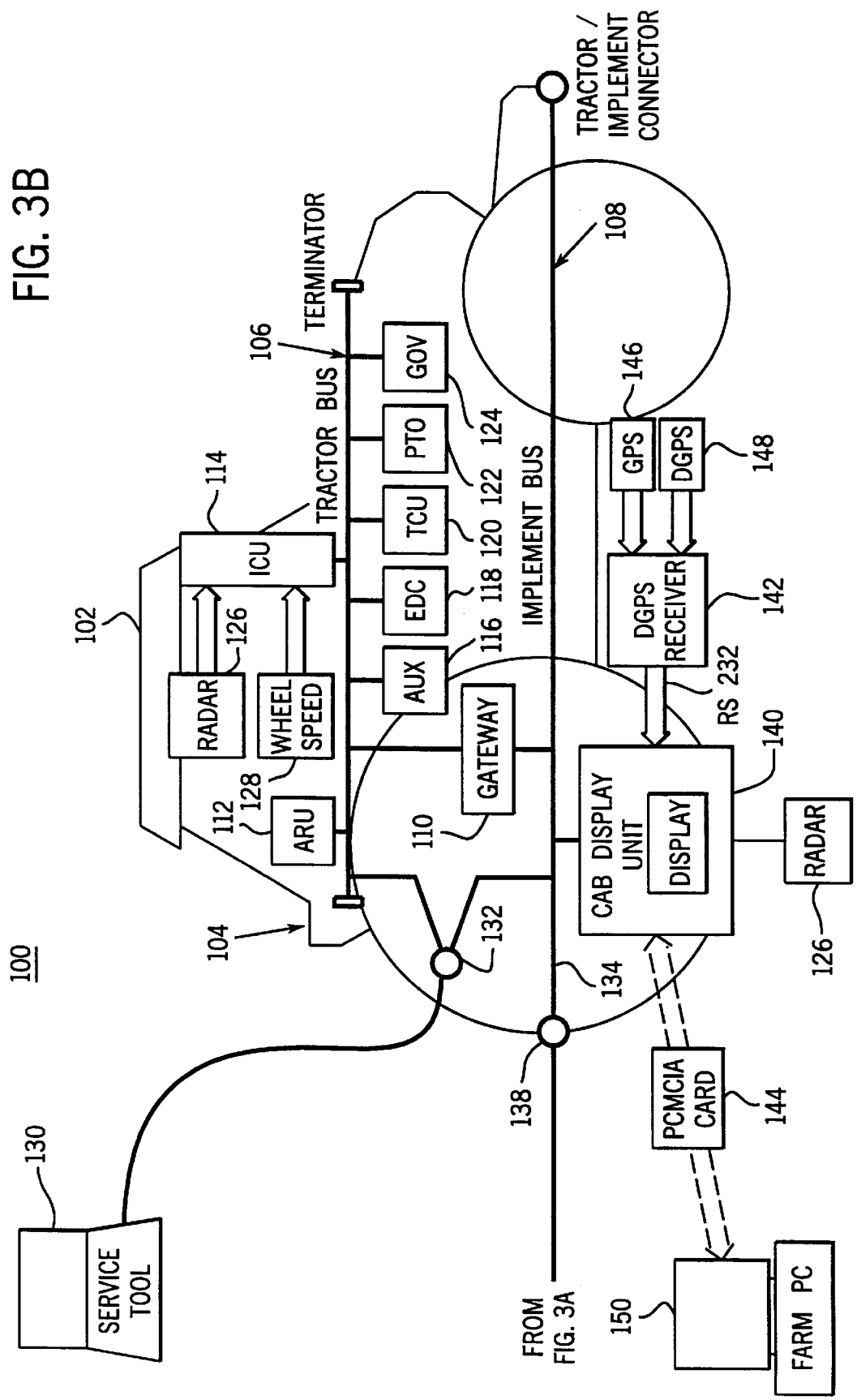

Referring to FIG. 3, a control system 100 is shown for an agricultural vehicle 102 (e.g., a tractor) pulling implement 10 (e.g., planter, conventional or air drill). System 100 includes electronic control units (ECUs) in communication with each other across a vehicle data bus 104. Bus 104 includes a tractor bus segment 106 to pass data throughout vehicle 102, and an implement bus segment 108 to communicate between vehicle 102 and implement 10. Bidirectional data passes between busses 106 and 108 via a network interconnection ECU 110 (e.g., a gateway). Bus 104 preferably conforms to the "Recommended Practice for a Serial Control and Communications Vehicle Network" (SAE J-1939) which uses Controller Area Network (CAN) protocol for low-layer communications. ECU 110 performs network functions as described in the Network Layer specification of J-1939 by acting as a repeater for forwarding messages between segments 106 and 108, a bridge for filtering out messages not needed by the receiving segment, a message router for remapping addresses and a gateway to repackage messages for increased efficiency. Other bus formats, however, may also be used and ECU 110 may perform all or only a subset of the above-listed network functions.

Other ECUs coupled to tractor bus 106 include an armrest control unit (ARU) 112, instrument cluster unit (ICU) 114, auxiliary valve control unit (AUX) 116, electronic draft control unit (EDC) 118, transmission control unit (TCU) 120, power take-off control unit (PTO) 122, and engine governor control unit (GOV) 124. ICU 114 receives signals from a true ground speed sensor 126 (e.g., a radar) mounted to the body of vehicle 102. Ground speed sensor 126 (e.g., a radar) may also be in direct communication with a cab-mounted display unit (CDU) 140. A service tool 130 can be coupled to busses 106 and 108 via a diagnostic connector 132 for use during diagnostics and maintenance.

The ECUs coupled to tractor bus 106 are illustrative and other control units such as a performance monitor control unit or steering control unit could also be connected to bus 106. Further, the use of gateway 110 for communications between busses 106 and 108 allows a higher level of integration in tractors equipped with a tractor data bus. However, implement bus 108 and its associated ECUs may also be used to control implements pulled by other tractors which have no tractor data bus.

Implement bus 108 includes first and second segments 134 and 136 coupled via a connector 138 at the rear of vehicle 102. Segment 134 passes through vehicle 102 and segment 136 provides a communication pathway to implement 10. Thus, implement bus 108 reduces wiring needs between implement 10 and vehicle 102. Besides gateway ECU 110, ECUs coupled to segment 134 include cab-mounted display unit (CDU) 140. CDU 140 provides an operator interface, a serial interface (e.g., RS-232) to receive positioning signals from a DGPS receiver 142, and an interface for a memory card 144 (e.g., a PCMCIA card). Receiver 142 receives GPS and DGPS signals from antennas 146 and 148. Memory card 144 transfers geo-referenced map data (e.g., prescription and application rate maps defined by GIS or Global Information System databases) between control system 100 and an external computer 150. Prescription maps include application rate commands, and application rate maps record actual (i.e., sensed) application rates.

ECUs coupled to segment 136 of implement bus 108 are mounted to frame 12 of implement 10. These ECUs include a monitor interface unit (MIU) 152 and one or more multi-channel control units (MCCs) 154. Each implement section typically includes one "local" MCC 154 to control product application rates. MIU 152 monitors application rates of products (e.g., seeds) to rows and other parameters (e.g., bin level, ground speed, wheel speed, meter pressure) based on signals generated by monitoring sensors 156, implement status devices 158 and a wheel speed sensor 128 (e.g., inductance magnetic pickup sensor) coupled to the vehicle's wheels. MIU 152 also receives global commands from CDU 140 via bus 108, generates global control signals using the global commands, and applies the global control signals to global output devices 160 to perform global implement functions (e.g., lighting, frame, marker control). MCCs 154 receive local product application rate commands from CDU 140 based on signals generated by application sensors 161, generate local control signals for local product metering devices 162, and apply the local control signals to metering devices 162. Further, MCCs 154 may generate control signals for a variety or type switch 164 which selects the variety or type of farming inputs applied. MCCs 154 may also generate control signals for a section control switch 165 which selects which sections are enabled or disabled.

Referring to FIG. 4, CDU 140 is an ECU mounted in the cab of vehicle 102. CDU 140 includes a display unit 200 including a touch screen 202 (e.g., a TFT 10.4" color display with digital touch screen), system touch screen switches 204, reconfigurable touch screen switches 206 and system reset switch 208. A ½ VGA monochrome DMTN display with LED backlighting could also be used. CDU 140 has interfaces 210–224 for implement bus 108, a remote keypad 226, DGPS receiver 142, digital inputs (e.g., an in-cab remote switch 228), frequency inputs such as radar 126, memory card 144 and tractor bus 106. CDU 140 includes an audible alarm 230. A processor (e.g., ARM LH74610 RISC processor) coupled to memory circuits (e.g., RAM, EEPROM, Flash EPROM) provides control for CDU 140.

Control system 100 can control different planting implement applications. An operator uses touch screen 202 to navigate and perform common functions within each application. System touch screen switches 204 include a MODE switch for toggling between applications, a CALIBRATE switch for performing configuration and calibration functions, and a UTILITY switch for performing file transfers on card 144. Touch screen switches 206 select between items on reconfigurable menus to control the operations of control system 100. Reset switch 208 resets control system 100. Remote keypad 226, mounted via a cable near the operator when CDU 140 is mounted elsewhere in the cab, duplicates touch screen switches 206. In-cab remote switch 228 allows the operator to remotely start and stop product metering. Alarm 230 is used to alert the operator to error and alarm conditions.

Both global and local operations of implement 10 are controlled by actuations of touch screen switches 204–206. The global functions include lighting control (e.g., turning on and off lights attached to frame 12), frame control (e.g., raising and lowering frame 12; folding and unfolding wings 20) and marker control (e.g., alternately raising and lowering markers 50 or 52 on both sides of implement 10 to mark the centerline of the next pass). Actuations needed to control the global functions depend on the particular implement. When switch actuations relate to lighting, frame or marker control, CDU 140 generates global command signals which are communicated to MIU 152 via bus 108 for controlling global output devices 160.

The local implement functions include variable-rate application of products to a field. Touch screen switches 204–206 are actuated to control the rates in a manual or an automatic mode. In manual mode, the actuations set, increase or decrease the desired application rates for one or more products applied by each section. In automatic mode, the actuations select between one or more prescription maps stored on card 144. The maps include geo-referenced data representing desired application rates of one or more products at positions throughout a field. Desired rates are determined, for example, off-line using computer 150. The selected maps are indexed using positioning signals received by DGPS receiver 142 to determine the desired application rates which are then used to generate local product rate commands transmitted to MCCs 154.

Figure 5:
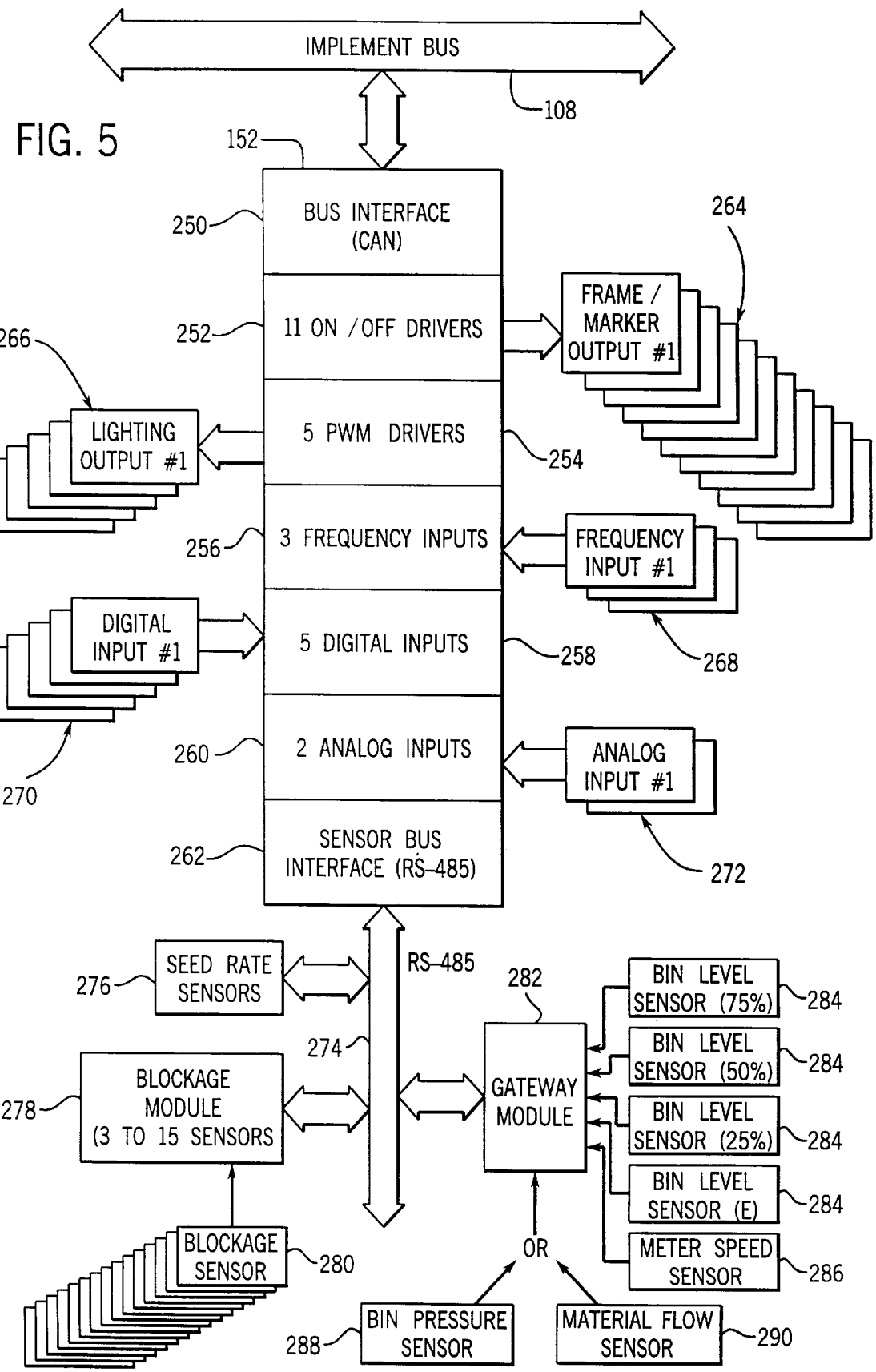
FIG. 5 is a block diagram of the monitor interface unit (MIU) of FIG. 3, and the interfaces between the MIU and other components of the control system.

Referring to FIG. 5, MIU 152 is an ECU supported on frame 12 which includes interfaces 250–262 for implement bus 108, frame/marker outputs 264 (e.g., markers 50, 52; wings 20), lighting outputs 266, frequency inputs 268, digital inputs 270, analog inputs 272 and sensor bus 274. Interfaces 250–262 include spares such that MIU 152 can be used in multiple applications. MIU 152 is connected in control system 100 as shown below. Sensor bus 274 is coupled to seed rate sensors 276, a blockage module 278 coupled to blockage sensors 280, and a gateway module 282. Optical seed rate sensors 276 detect seeds passing through seed tubes to row units 14. Module 282 receives signals from optical bin level sensors 284, a meter speed sensor 286, and bin pressure or material flow sensor 288 or 290. Signals from bin level sensors 284 indicate when the bins of seed modules 16 are 75% full, 50% full, 25% full, and Empty. Sensor bus 274 is preferably an RS-485 network as described in U.S. Pat. No. 5,635,911, herein incorporated by reference. MIU 152 is controlled by a processor 314 (FIG. 7; e.g., an AN8OC196CB processor) coupled to memory (e.g., RAM, EEPROM, Flash EPROM).

Control system 100 is a modular application control system which can be upgraded with additional controllers for expanded functionality. Initially, control system 100 includes CDU 140, implement bus 108 and MIU 152 which provide monitoring and global control functions. In the initial system, product application rates are controlled conventionally (e.g., by driving product metering devices using gears coupled to the implement wheels). FIGS. 6–12 show control system 100 in embodiments which provide for monitoring and global control functions for implements. Control system 100, however, can later be upgraded with MCCs 154 to provide variable-rate control. FIGS. 14–20 show upgraded control system 100 for the same implements.

Figure 6B:
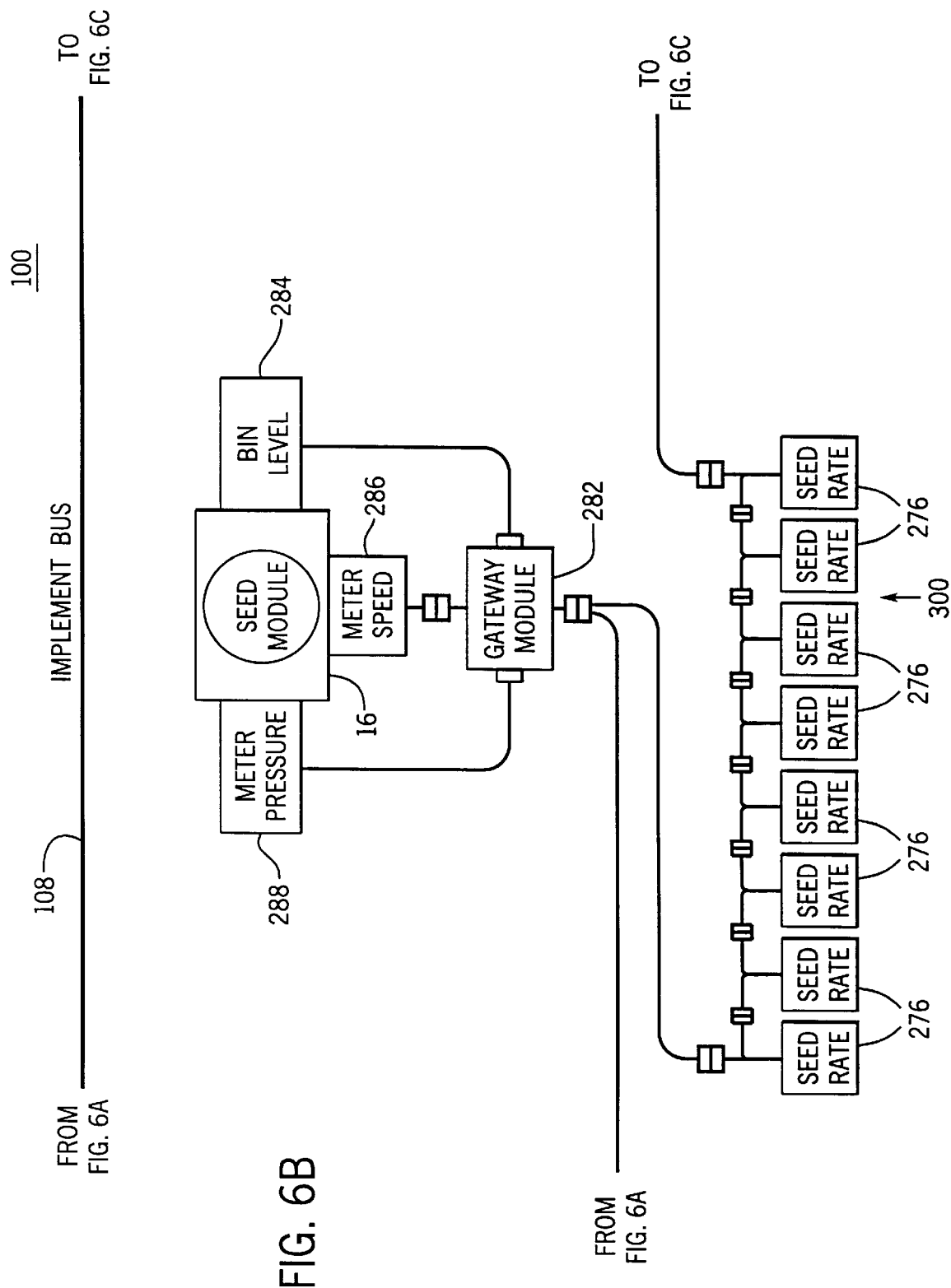
FIG. 6 is a block diagram of a control system for a planter (e.g., 12/23 SRC cyclo planter) including an MIU for monitoring sensors and controlling global functions.
Figure 6C:
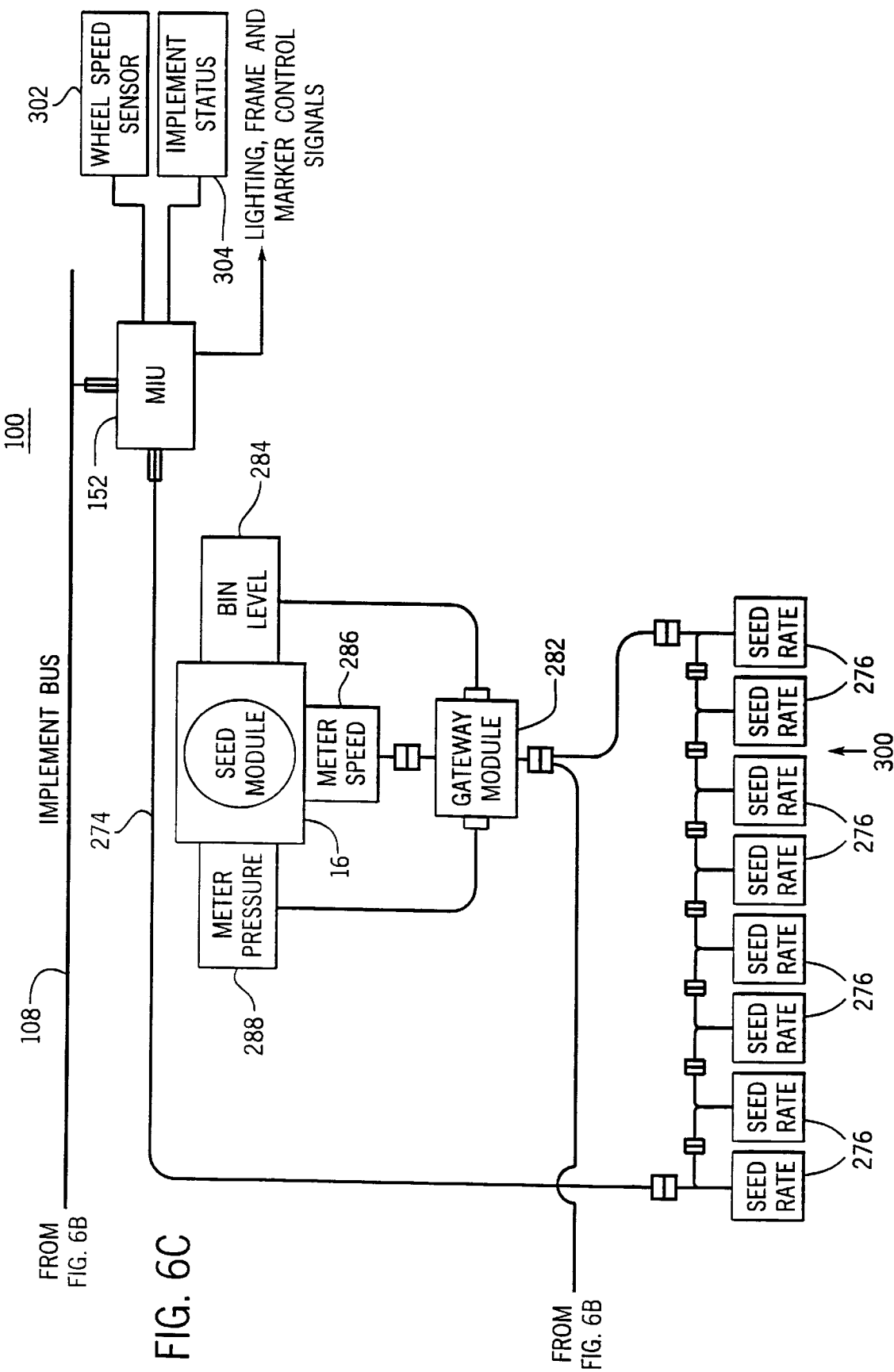

Referring to FIG. 6, control system 100 controls a 12/23 SRC cyclo planter implement 10 which includes three sections 300, each supporting multiple (e.g., 8, 8 and 7) row units 14 configured to apply seeds to a field. Seeds are metered by a seed module 16 on each section 300. MIU 152 receives global command signals via bus 108 from CDU 140, and sends back monitored data. MIU 152 receives speed signals used to calculate seeding data (e.g., area seeded) from a sensor 302 coupled to the planter wheels. MIU 152 receives signals indicating whether implement 10 is up or down from a status sensor 304. The application of products is disabled when implement 10 is raised.

Sensor bus 274 is connected to a seed rate sensor 276 associated with each row unit 14. MIU 152 monitors seed application rates using signals received from seed rate sensors 276, and sends seed rate data to CDU 140 via bus 108. Bus 274 is coupled to a gateway module 282 for each section 300 which monitors the status of each seed module 16 using signals received from bin level sensors 284, meter speed sensor 286, and bin pressure sensor 288. MIU 152 transmits meter status to CDU 140. Connectors separate MIU 152, sensors 276 and gateway modules 282.

Figure 7:
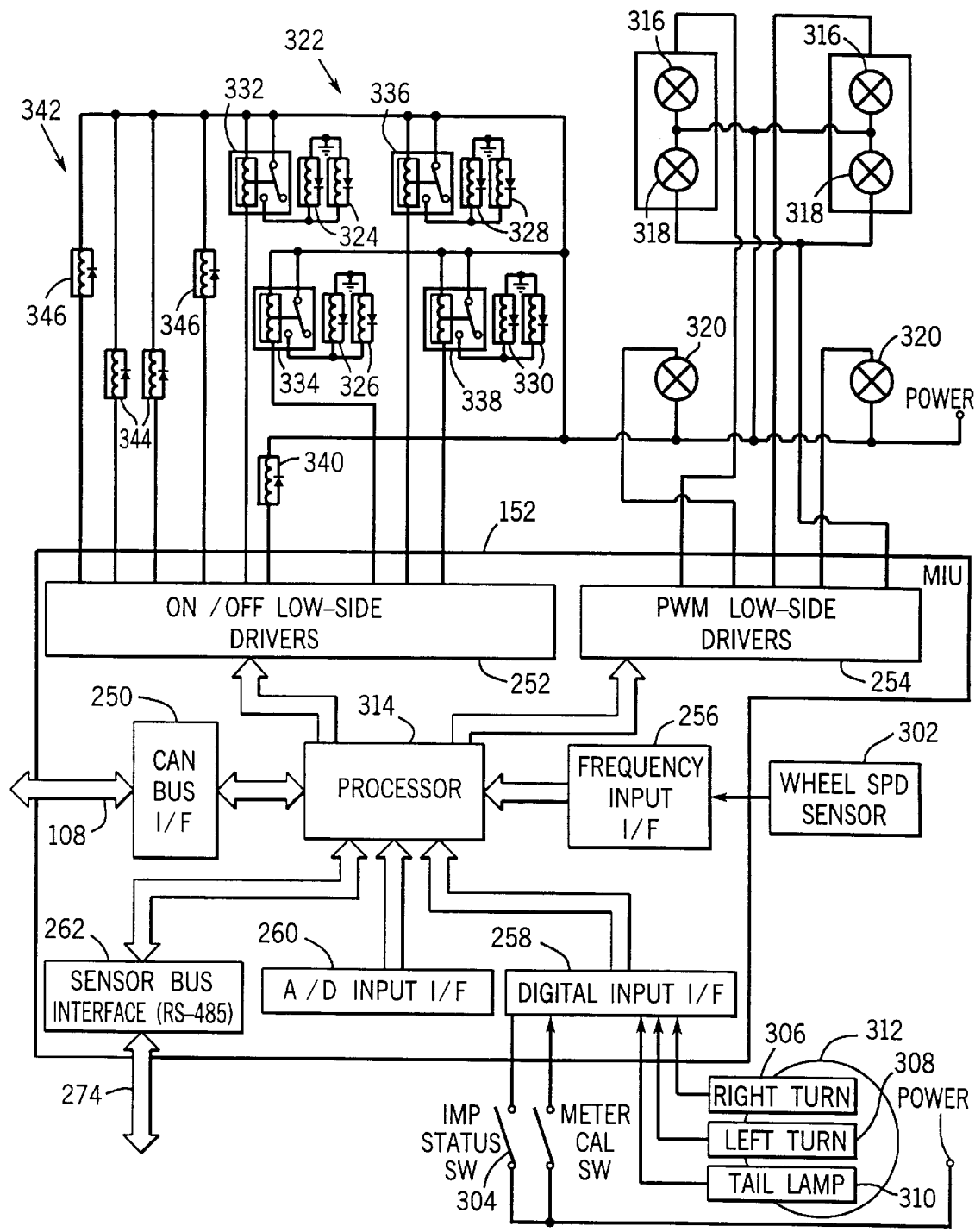
FIG. 7 is an electrical block diagram showing the MIU and the interfaces between the MIU and the lighting, frame and marker systems of the planter in FIG. 6.

Referring to FIG. 7, MIU 152 controls the planter's lighting, frame and marker systems. The lighting system commands include right turn, left turn, and tail lamp signals received on conductors 306–310 from a connector 312 at the rear of vehicle 102. Processor 314 reads the signals on conductors 306–310, converts these standard signals to enhanced lighting commands based on the ASAE S279 standard, and applies these commands to drivers 254 to generate enhanced control signals applied to left and right enhanced signal lamps including turn/flash lamps 316, tail lamps 318, and enhanced turn lamps 320. Lamps 316–320 enhance the turn signals warning motorists that vehicle 102 and implement 10 are turning. In contrast to current turn signal lamps, neither of the enhanced lamps will flash when implement 10 is in transport mode only. Additionally, the opposite turn signal lamp will not light steadily when making a turn. Thus, the lighting system of MIU 152 allows an implement which is compatible with the enhanced lighting standard to be connected directly to connector 312 of existing tractors.

Commands for the frame control system are received by processor 314 from CDU 140 via bus 108. Based on the commands, processor 314 commands drivers 252 to generate frame control signals applied to a solenoid circuit 322. Circuit 322 includes valve coils which control the flow of hydraulic fluid to actuators which move frame members such as wings 20. The coils include left and right tuck wheel solenoids 324, raise limit solenoids 326, marker isolation solenoids 328, and slave return solenoids 330. Circuit 322 uses relay circuits 332–338 to apply power simultaneously to each pair (left and right) of solenoids 324–330. There is one fold solenoid 340. Solenoids 324–330, 340 are connected to frame actuators as shown below.

Processor 314 also receives commands for the marker control system from CDU 140 via bus 108. Based upon the commands, processor 314 commands drivers 252 to generate marker control signals applied to a marker circuit 342. Circuit 342 includes coils which control fluid applied to marker actuators. The coils include left and right inner and outer marker solenoids 344 and 346 turned on and off by grounding the low-sides, thereby selectively supplying hydraulic fluid to the marker actuators as shown below.

Figure 8:
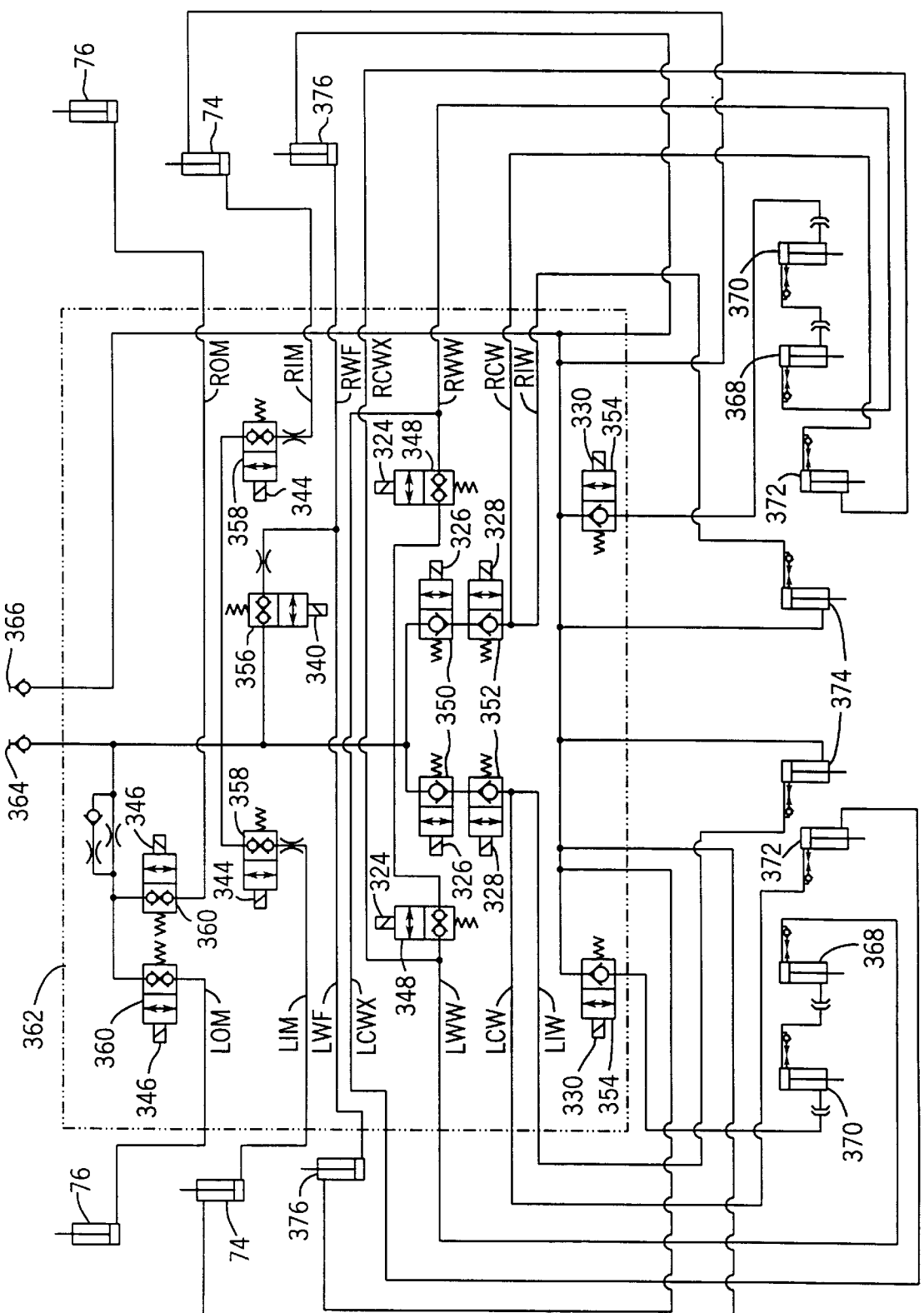
FIG. 8 is a hydraulic schematic showing interfaces between the hydraulic valves and cylinders of the frame and marker control systems of the planter in FIG. 6.

Referring to FIG. 8, frame solenoids 324–328, 340 and marker solenoids 344–346 control the flow of fluid through hydraulic cartridge valves 348–360, respectively. Valves 348–360, made by Hydraforce, check flow in both directions and are located within a composite valve block 362 having a fluid supply line 364 and return line 366. Valves made by Vickers may also be used, but two Vickers valves are needed to check the flow in both directions.

Implement 10 includes, for example, left and right wing wheels (LWW, RWW), left and right center wheels (LCW, RCW), and left and right inner wheels (LIW, RIW). Fluid from tuck valves 348 is supplied to left and right wing wheels (LWW, RWW), and is cross-linked to the right and left center wheels (RCWX, LCWX). Fluid from raise limit and marker/isolation valves 350 and 352 is supplied to the left and right center and inner wheels (LCW, RCW, LIW and RIW). Fluid from fold valve 356 is supplied to left and right fold members (LWF, RWF). Fluid from inner and outer marker valves 358 and 360 is supplied to left and right outer and inner markers (LOM, ROM, LIM, RIM).

Fluid from tuck valves 348 is received by the piston end of first slave cylinders 368, passed from the rod end of cylinders 368 to the piston of second slave cylinders 370, and returned via slave return valves 354 from the rod end of cylinders 370 to return line 366. Fluid from raise limit and marker/isolation valves 350 and 352, which check flow in opposite directions, is received by piston ends of master and assist cylinders 372 and 374. Fluid from the rod end of master cylinders 372 crosses to the piston end of opposite slave cylinders 368 and fluid from the rod end of cylinders 370 returns on line 366. Thus, master cylinders 372 are connected in master-slave arrangements to opposite slave cylinders 368 and 370 to coordinate movement of center and wing wheels LCW, RCW, LWW, RWW such that each pair of wheels extends the same amount, thereby evenly raising and lowering implement 10. Master cylinders 372, slave cylinders 368 and 370, and assist cylinders 374 form a lift circuit. Fluid from fold valve 356 is received by the piston end of fold cylinders 376 and is returned to return line 366. Fluid from marker valves 358 and 360 is received by the piston end of outer and inner marker cylinders 74 and 76, and returned from the rod end of cylinders 74 to line 366.

Thus, tuck and slave return solenoids 324 and 330 control the flow to slave cylinders 368 and 370 to tuck wing wheels LWW and RWW. Energizing solenoids 324 and 330 (while de-energizing raise limit and marker/isolation solenoids 326 and 328) causes fluid to flow from supply line 364 through tuck valves 348 to slave cylinders 368 and 370 and through slave return valves 354 to line 366. This flow extends cylinders 368 and 370 to tuck the wing wheels during transport. After tucking the wing wheels, slave return solenoids 330 are de-energized to prevent fluid loss and to prevent the wheels from sagging down.

Once implement 10 reaches a predetermined height, raise limit solenoids 326 shut off the flow to the lift circuit including cylinders 368–374 to prevent implement 10 from being raised higher. Because raise limit valves 350 check flow in only one direction, implement 10 can still be lowered while solenoids 326 remain energized.

When implement 10 is raised with markers 52 down, the weight of implement 10 causes pressure in hydraulic lines which can unexpectedly cause the markers to raise. To prevent this, marker isolation solenoids 328 are de-energized such that valves 352 check flow from the lift circuit to markers 52. Thus, the markers are prevented from being raised unexpectedly if implement 10 is raised.

Markers 52 (or 50) are controlled to indicate the centerline of the next implement pass. Marker status is displayed on display unit 200 of CDU 140. For example, an icon for each marker 52 indicates whether the marker is active or inactive. Touching the inactive marker's icon causes CDU 140 to communicate a message to MIU 152 to cause MIU 152 to advance markers 52. Markers 52 can also be advanced automatically by alternating from left to right with each raise/lower cycle of implement 10 based upon the implement status input 304. Single-stage markers 50 move to fully-folded states during transport, and alternate between fully-folded and unfolded states for field operations. Dual-stage markers 52 move to fully folded states for transport, and alternate between partially folded and unfolded states during operations.

Figure 9A:
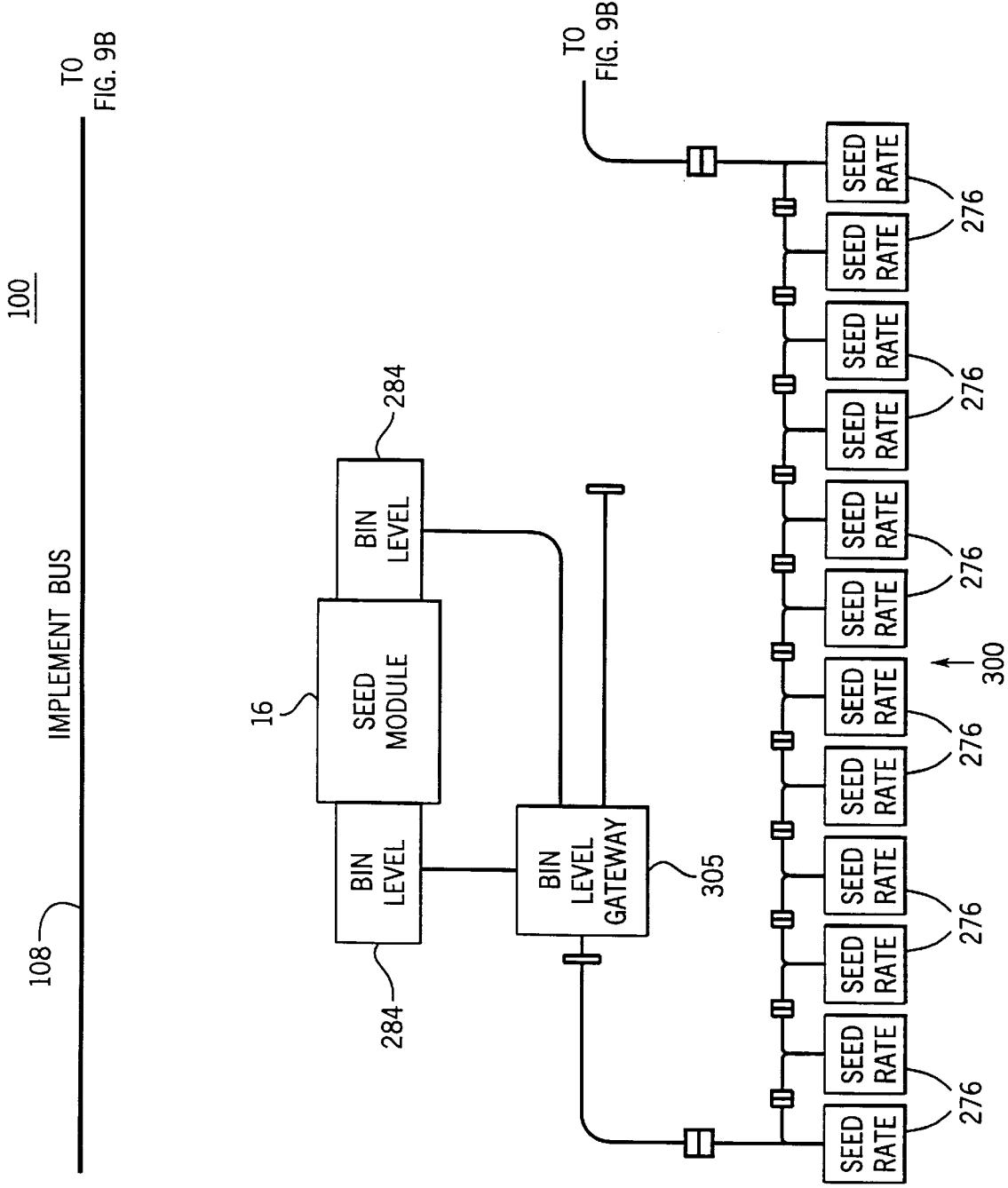
FIG. 9 is a block diagram of a control system for a conventional drill (e.g., a soybean special grain drill) including an MIU for monitoring sensors and controlling global functions.
Figure 9B:
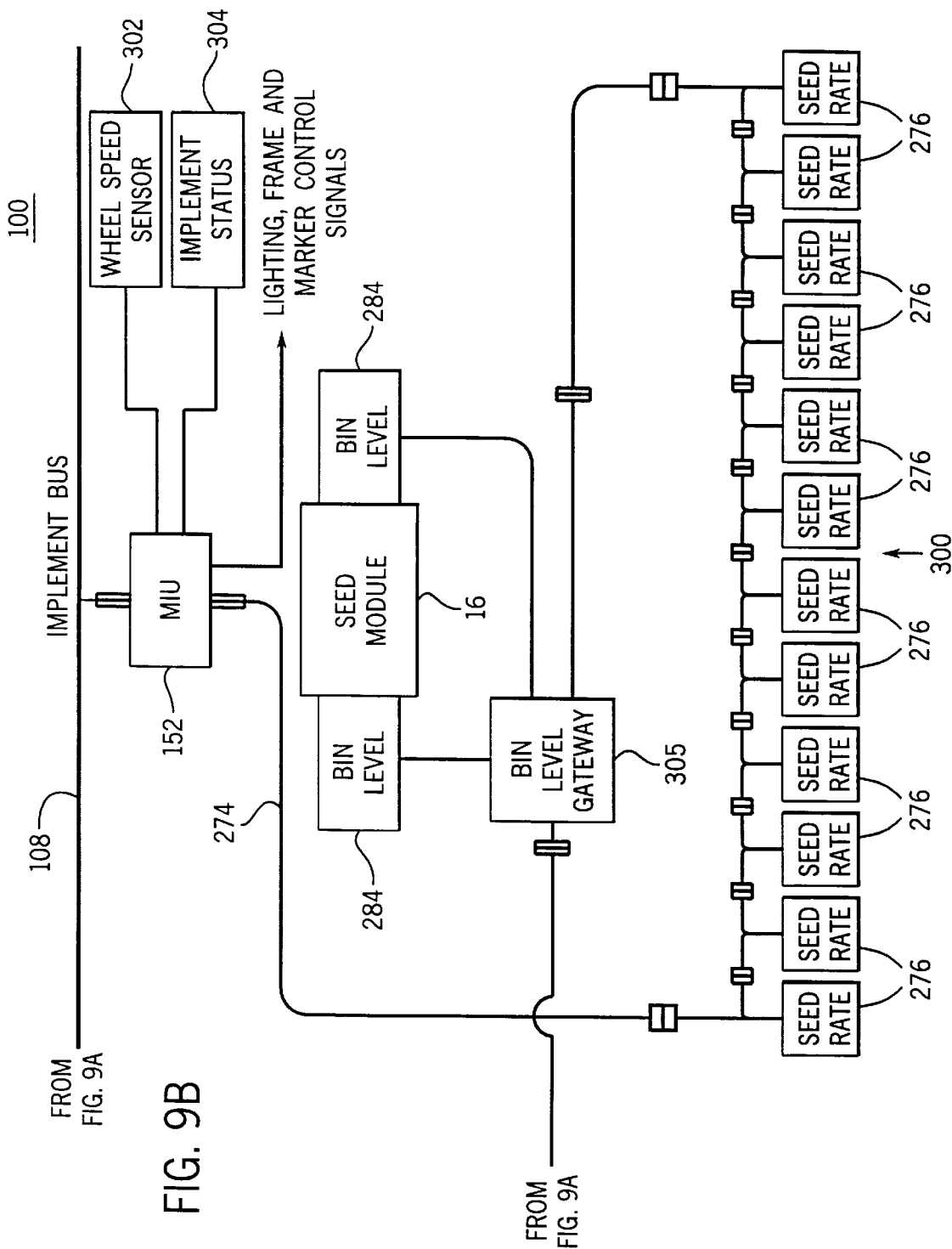

Referring to FIG. 9, another embodiment of control system 100 is configured to control a conventional 5500 Soybean Special grain drill including two sections 300. Each section 300 supports multiple (e.g., 12 and 12) row units 14 configured to apply seeds to a field. Seeds are metered by a seed module 16 on each section 300. MIU 152 receives global command signals from CDU 140, and returns monitored data. MIU 152 receives speed signals used to calculate seeding data from sensor 302 coupled to the drill's wheels, and receives signals indicating whether implement 10 is up or down from sensor 304. Application of products is disabled when implement 10 is raised.

Sensor bus 274 connects to a seed rate sensor 276 associated with each row unit 14. MIU 152 monitors seed application rates using signals received from sensors 276, and sends seed rate data to CDU 140. Bus 274 is also coupled to bin level gateway modules 305 which monitor and receive bin level signals from bin level sensors 284 on each section 300. Bin status data is transmitted to CDU 140 and connectors separate MIU 152 and sensors 276 and 284.

Figure 10:
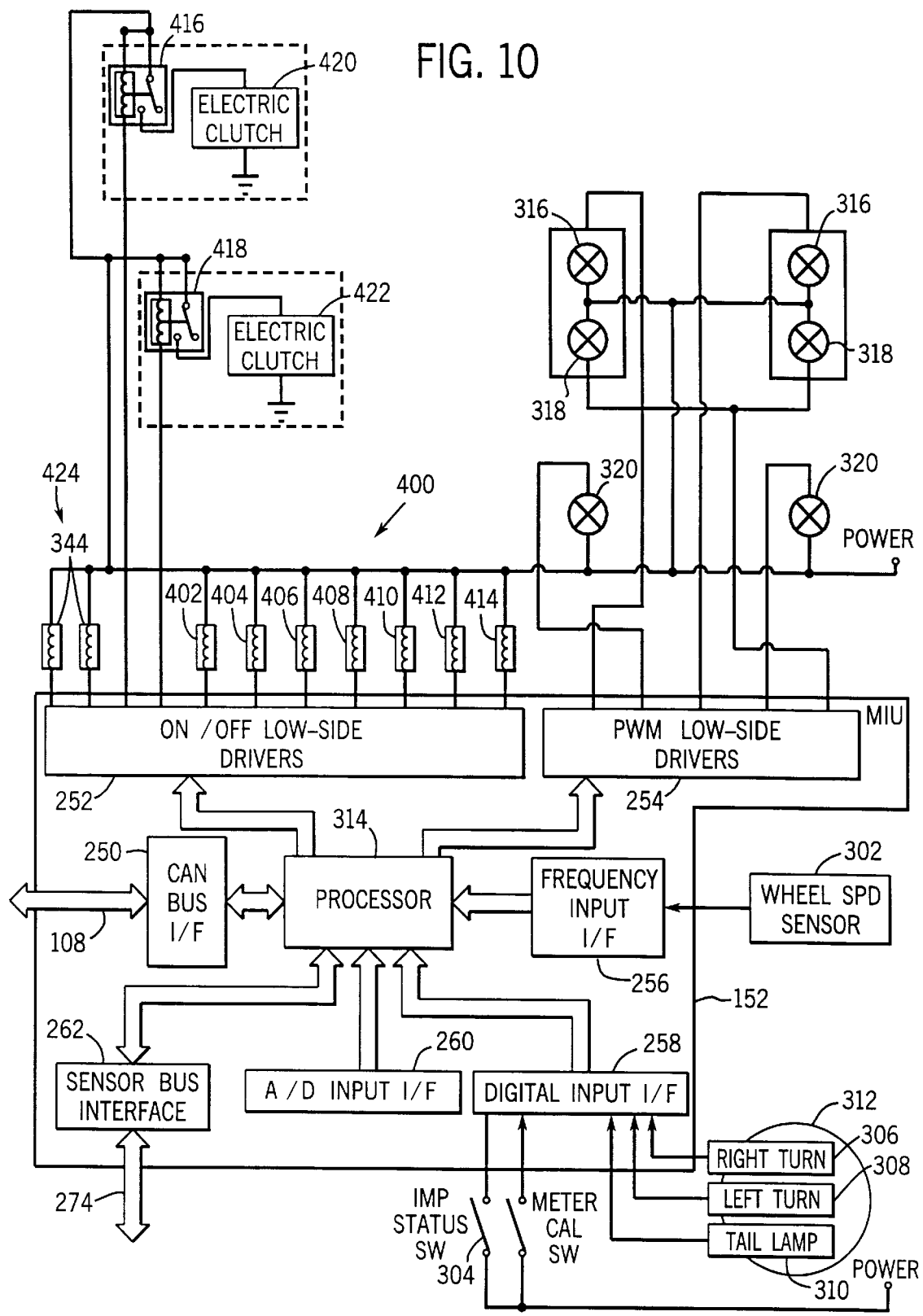
FIG. 10 is an electrical block diagram showing the MIU and the interfaces between the MIU and the lighting, frame and marker systems of the drill shown in FIG. 9.

Referring to FIG. 10, MIU 152 controls the lighting, frame and marker systems of the conventional grain drill. The lighting control system is as described in relation to FIG. 7. The frame control system includes a solenoid circuit 400 including coils controlling fluid applied to frame actuators. The coils include a fold lock solenoid (lower) 402, left-hand gauge cylinder solenoids (lower, raise) 404 and 406, right-hand gauge cylinder solenoids (raise, lower) 408 and 410, cart and gauge cylinder solenoids (lower) 412 and 414, and relays 416 and 418 for applying power to electric clutches 420 and 422 for two bins. The marker control system has a marker circuit 424 with left and right marker solenoids 344 for controlling single-stage markers 50. Frame and marker control system commands are received by MIU 152 from CDU 140, and are used to generate frame and marker control signals which are applied to circuits 400 and 424 by drivers 252.

Figure 11A:
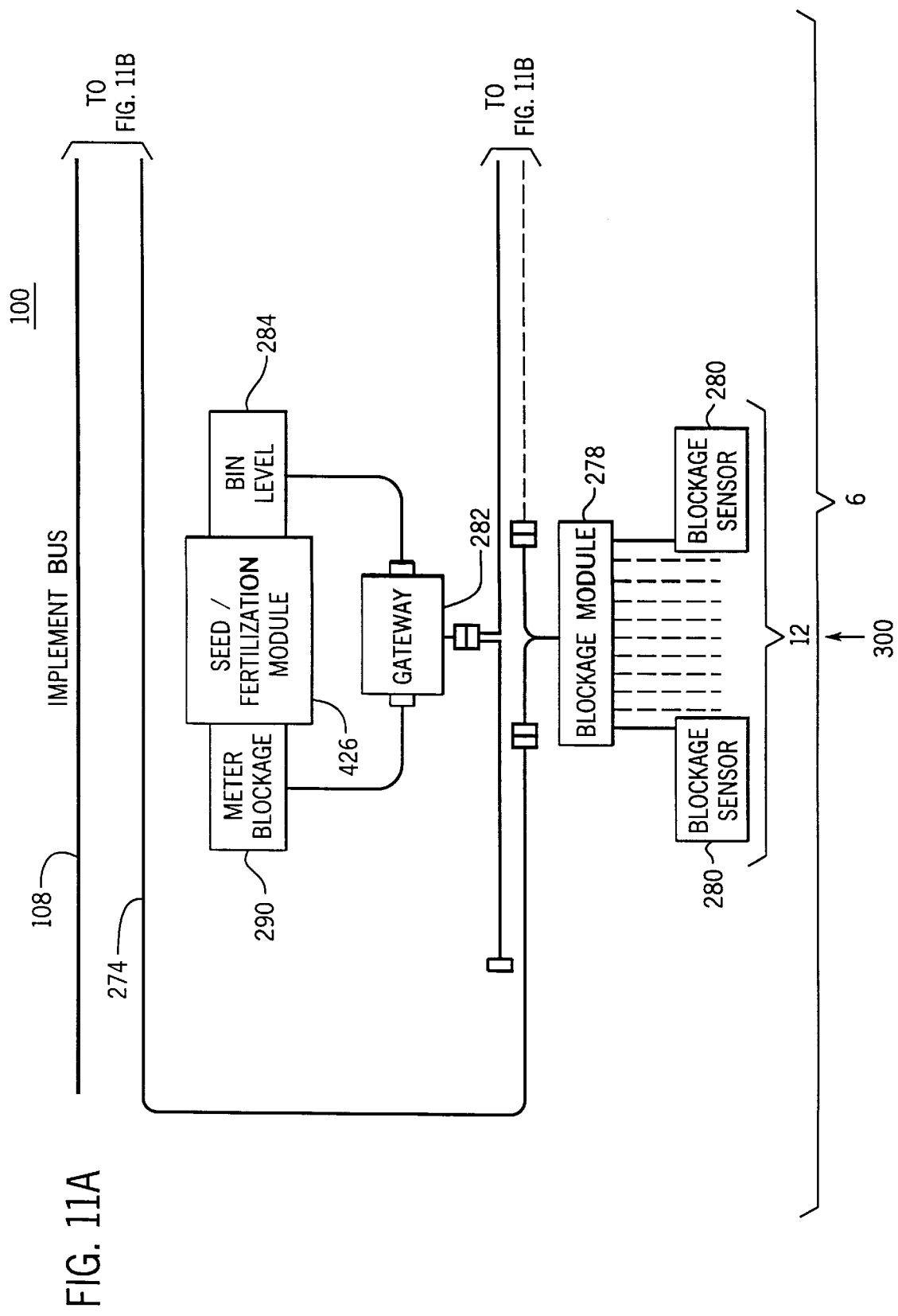
FIG. 11 is a block diagram of a control system for an air drill (e.g., Concord air drill) including an MIU for monitoring sensors and controlling global functions.
Figure 11B:
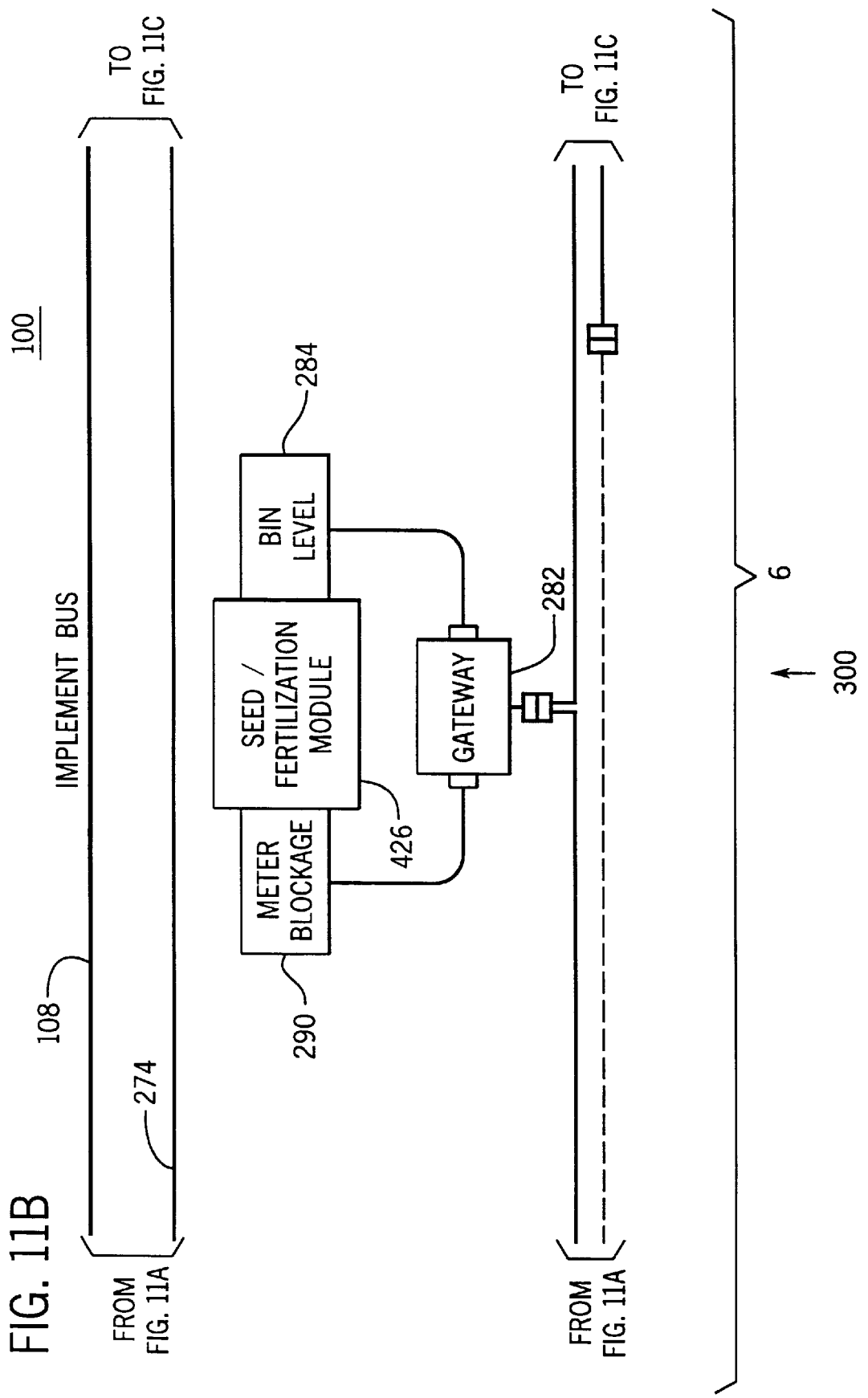
Figure 11C:
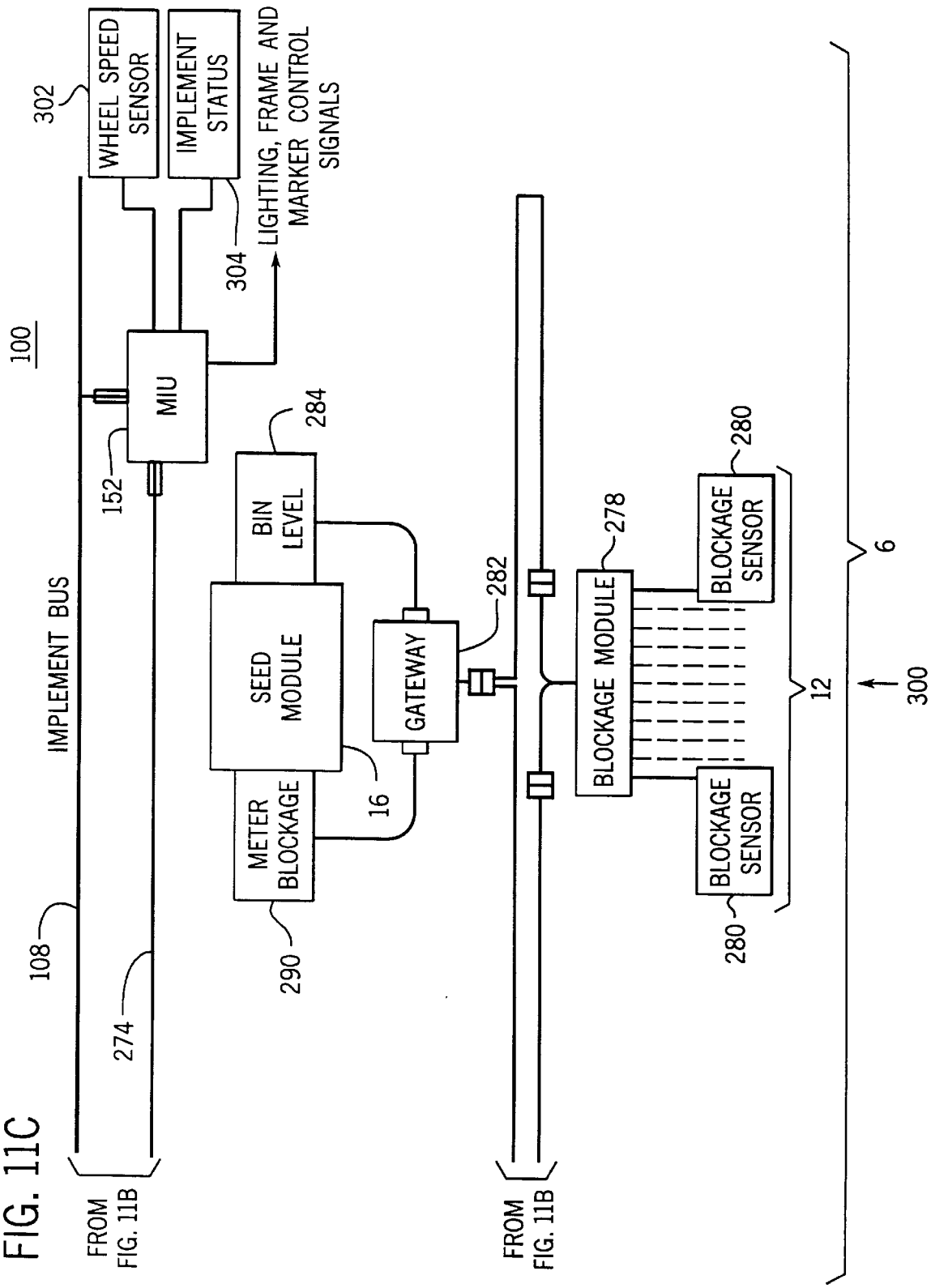

Referring to FIG. 11, another embodiment of control system 100 is configured to control a Concord air drill including six sections 300. Each section 300 supports a blockage module 278 coupled to 12 blockage sensors 280. Seeds are metered by a seed or seed/fertilization module 16 or 426 for each section 300. MIU 152 receives global command signals from CDU 140 and returns monitored data. MIU 152 receives speed signals used to calculate seeding data from wheel speed sensor 302. MIU 152 also receives signals indicating whether implement 10 is up or down from sensor 304, and wheel speed signals from wheel speed sensor 302. Product application is disabled with implement 10 raised.

Sensor bus 274 is connected to a blockage module 278 associated with each section 300. MIU 152 monitors seed blockages based on signals received from modules 278, and sends blockage data to CDU 140 via bus 108. Bus 274 is also coupled to a gateway module 282 on each section 300 which receives product meter status signals from bin level sensors 284 and meter blockage sensors 290. Meter status data is transmitted back to CDU 140 via bus 108.

Figure 12:
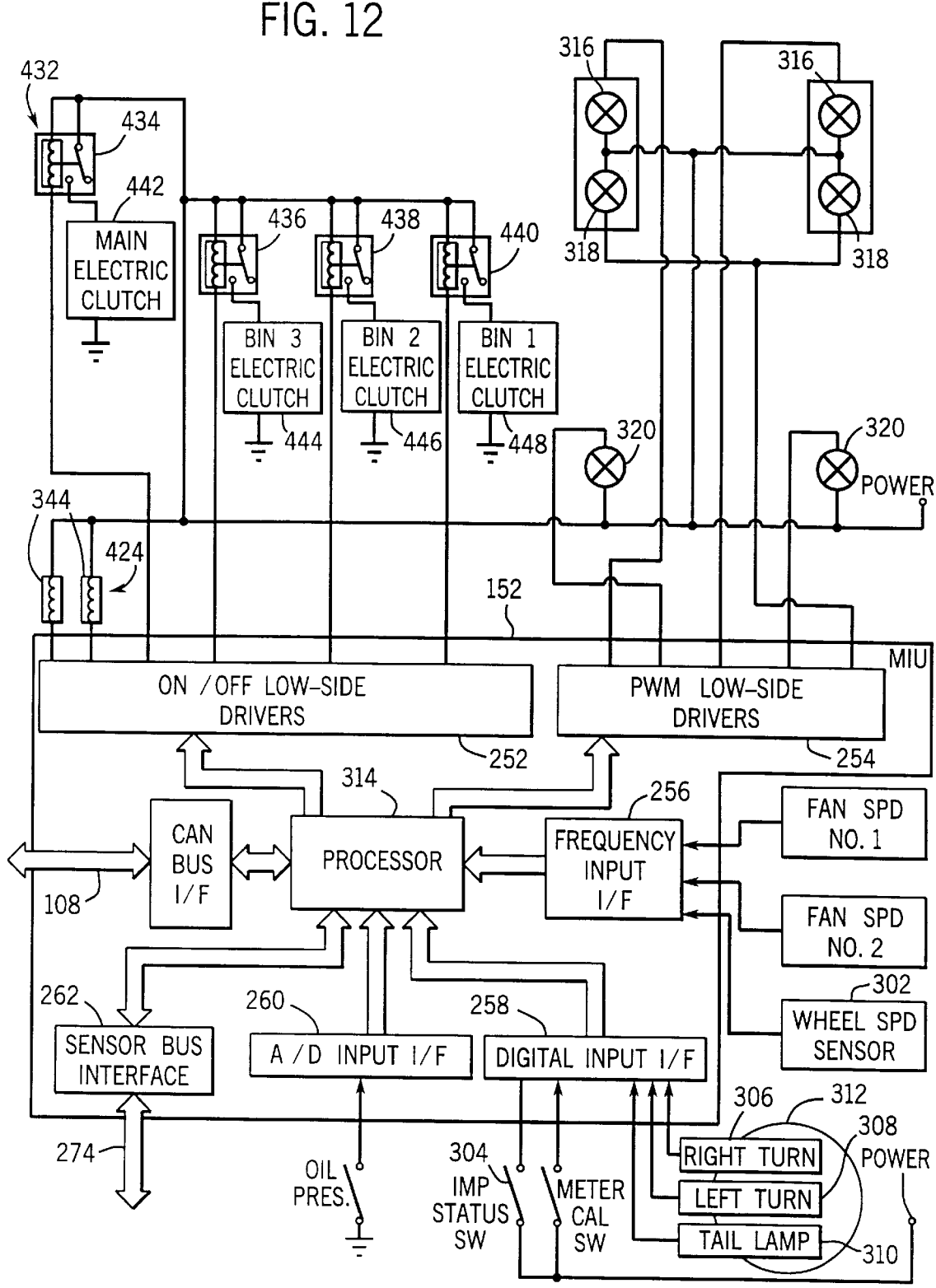
FIG. 12 is an electrical block diagram showing the MIU and the interfaces between the MIU and the lighting, frame and marker systems of the drill shown in FIG. 11.

Referring to FIG. 12, MIU 152 controls the lighting, frame and marker systems of the Concord air drill. The lighting and marker control systems are as described in relation to FIGS. 7 and 10. The frame control system includes a solenoid circuit 432 with coils controlling the fluid applied to frame actuators. The coils include relays 434–440 to apply power to a main electric clutch 442 and clutches 444–448 coupled to three product bins.

Figure 13:
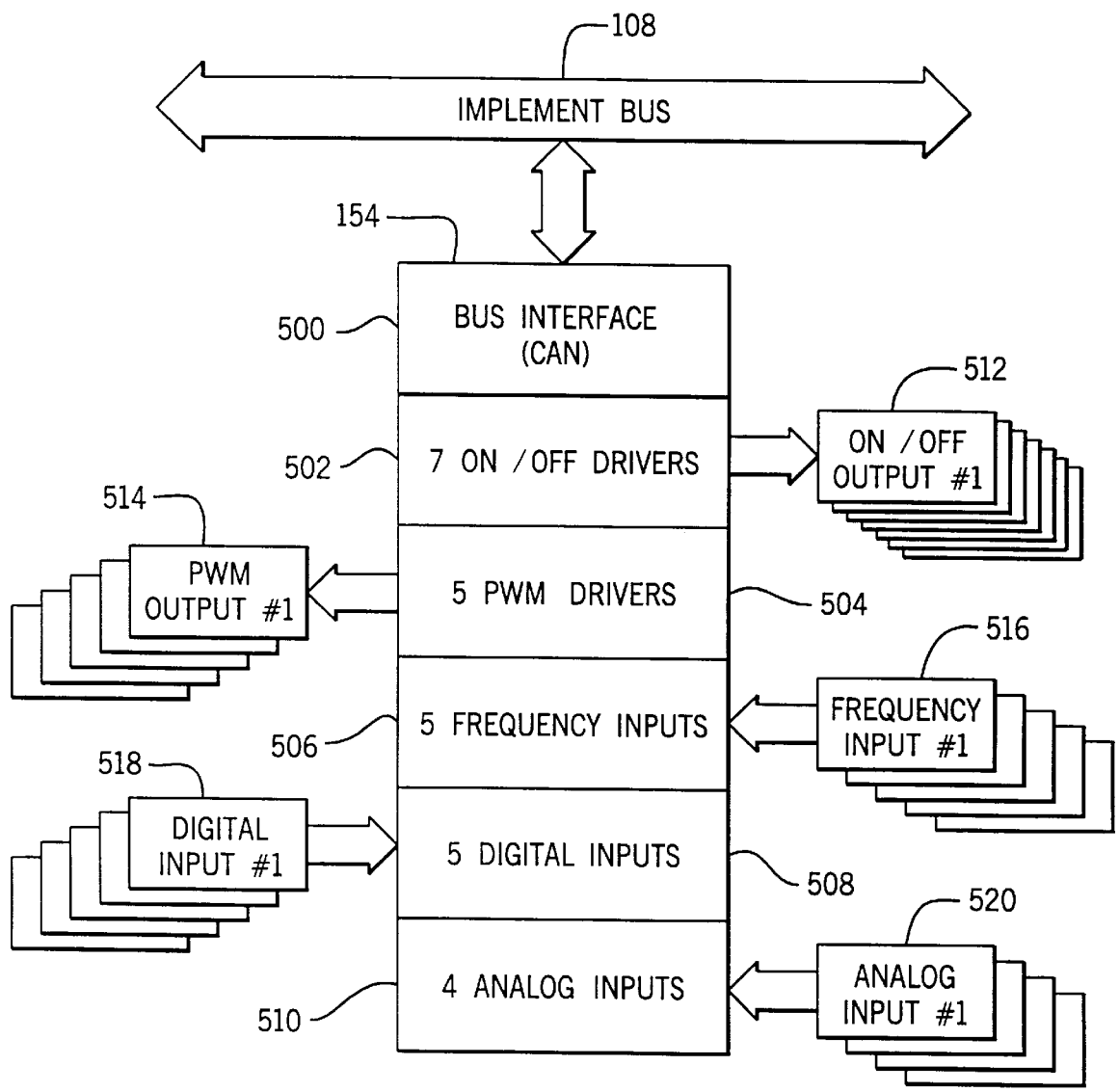
FIG. 13 is a block diagram of one multi-channel controller (MCC) of FIG. 3, and the interfaces between the MCC and other components of the control system.

Control system 100 may be upgraded by installing a removable MCC 154 on each frame section 300 to provide local variable-rate control. Referring to FIG. 13, each MCC 154 includes interfaces 500–510 for implement bus 108, on/off outputs 512 for driving valves, PWM outputs 514 for driving local product metering devices, frequency inputs 516, digital inputs 518, and analog inputs 520. Spare interfaces allow MCC 154 to be used in multiple applications. Connections between MCC 154 and control system 100 are shown below. MCC 154 is controlled by a processor 522 (FIG. 15; e.g., AN80C196CB) coupled to memory circuits (e.g., RAM, EEPROM, Flash EPROM).

Figure 14A:
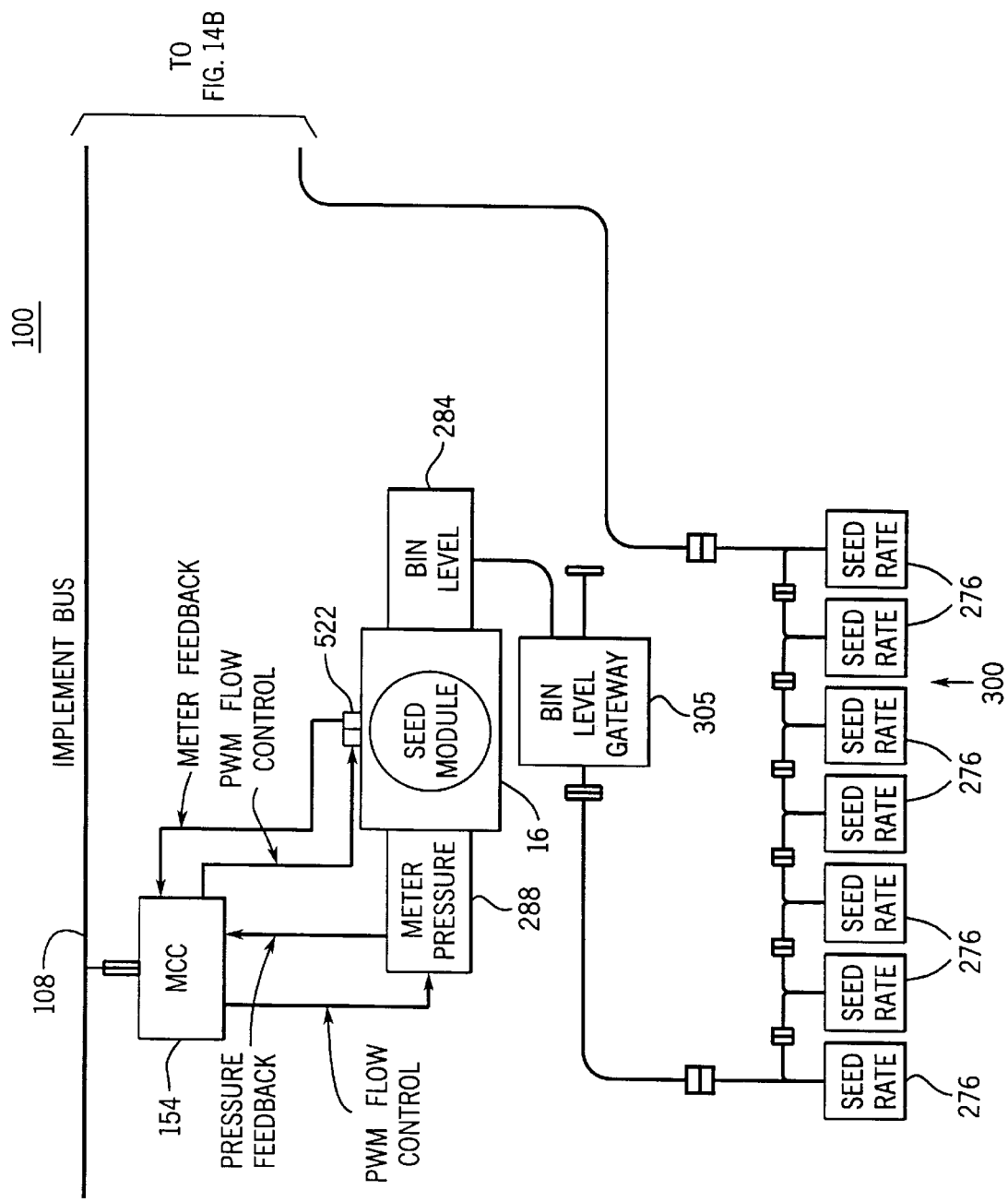
FIG. 14 is a block diagram of a control system for a planter as in FIG. 6 which further includes local MCCs to control the seed rates of each section.
Figure 14C:
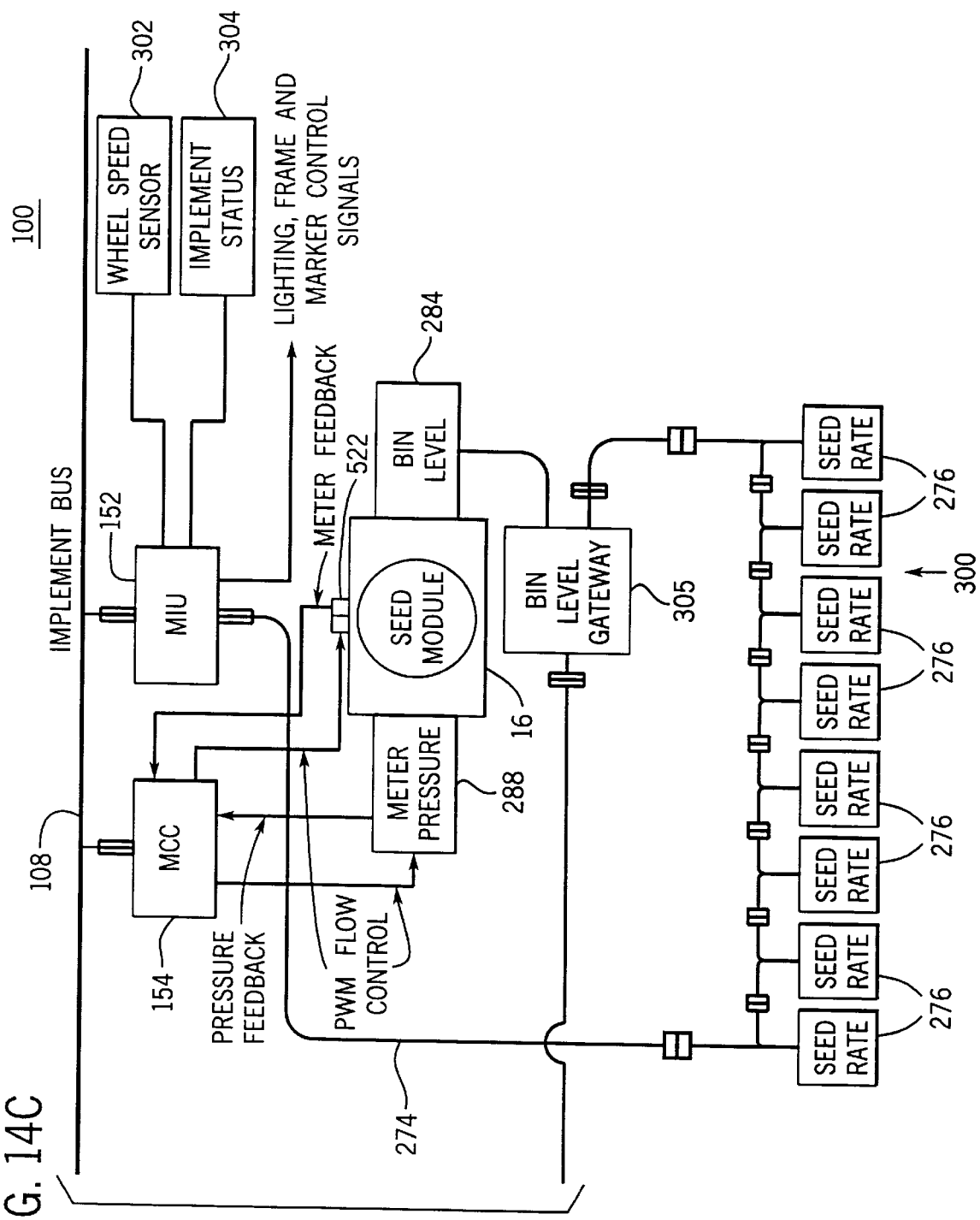

Referring to FIG. 14, another embodiment of control system 100 also controls the cyclo planter. In contrast to FIG. 6, however, MCCs 154 control the seed application rates of each section 300 based on rate command signals received from CDU 140 via bus 108. Each MCC 154 converts the rate command signals into control signals which are applied to a cyclo seed meter 522 (i.e., drum) on seed module 16. MCC 154 receives meter feedback speed signals from meter 522, and communicates meter speed data back to CDU 140 for display. MCC 154 can also use the meter speed feedback signals for closed-loop metering control. Each MCC 154 also applies control signals to bin pressure or material flow sensor 288, receives pressure feedback signals from sensor 288, and communicates bin pressure data back to CDU 140 for display.

Figure 15:
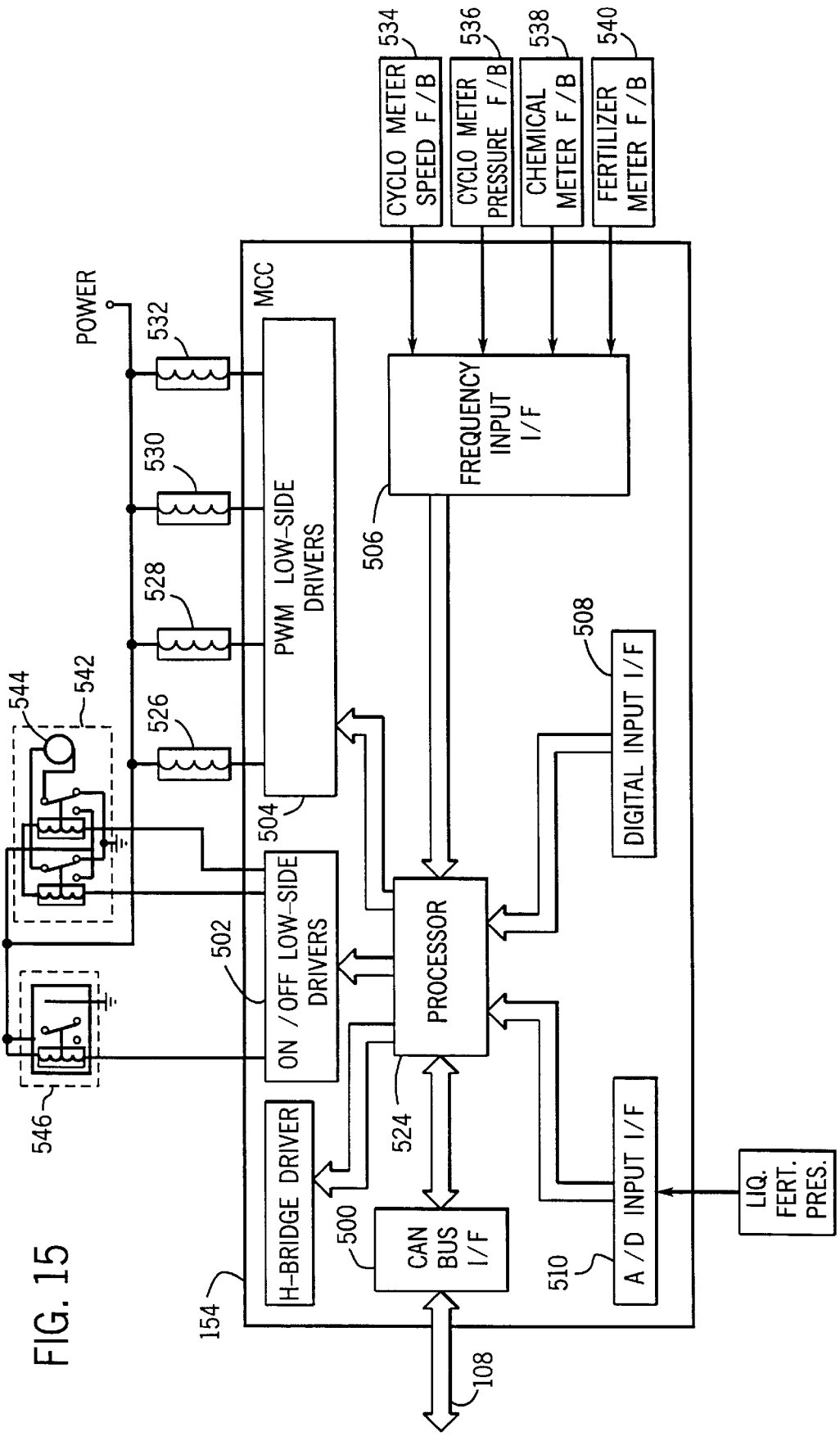
FIG. 15 is an electrical block diagram showing the MCC and interfaces between the MCC and metering systems (seed, chemical, fertilizer) of the planter in FIG. 14.

Referring to FIG. 15, when installed, each local MCC 154 controls product application rates for one section of implement 10. The controlled products may include seeds, granular chemicals and liquid fertilizers. Commands for each product being applied are received by MCC processor 524 from CDU 140. Processor 524 commands drivers 504 to generate PWM control signals based on the commands which are applied to a cyclo seed meter solenoid 526, a blower motor solenoid 528, a chemical meter solenoid 530 and a liquid fertilizer meter solenoid 532. Feedback signals are received from a cyclo seed meter speed sensor 534, a cyclo meter pressure sensor 536, a chemical meter speed sensor 538, and a fertilizer meter speed sensor 540.

Processor 524 may also control the variety of seeds being applied by generating variety control signals based upon command signals received from CDU 140. The control signals are applied to a relay circuit 542 which applies power to a variety selection switch 544 to select between two varieties of seeds. Processor 524 further controls a relay circuit 546 configured to open and shut a liquid fertilizer control valve for the local section 300.

Figure 16:
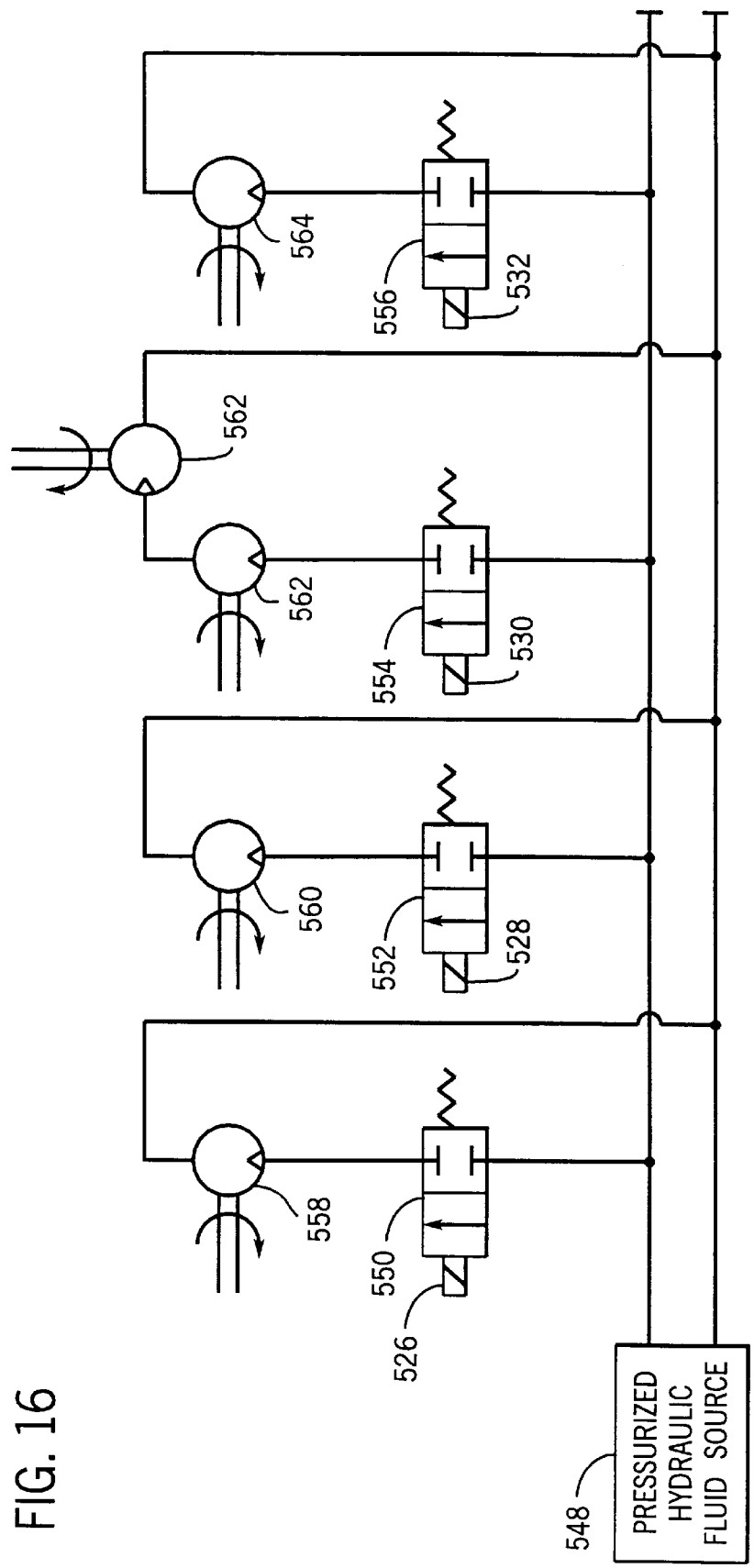
FIG. 16 is a hydraulic schematic showing interfaces between the hydraulic valves and motors (seed, blower, chemical, fertilizer) of the planter shown in FIG. 14.

Referring to FIG. 16, solenoids 526–532 control the flow of fluid from a pressurized hydraulic fluid source 548 through valves 550–556 to a seed drum motor 558, a blower motor 560, chemical motors 562 and a fertilizer motor 564. These motors control the seeding rate, fan speed, and chemical and fertilizer application rates.

Figure 17A:
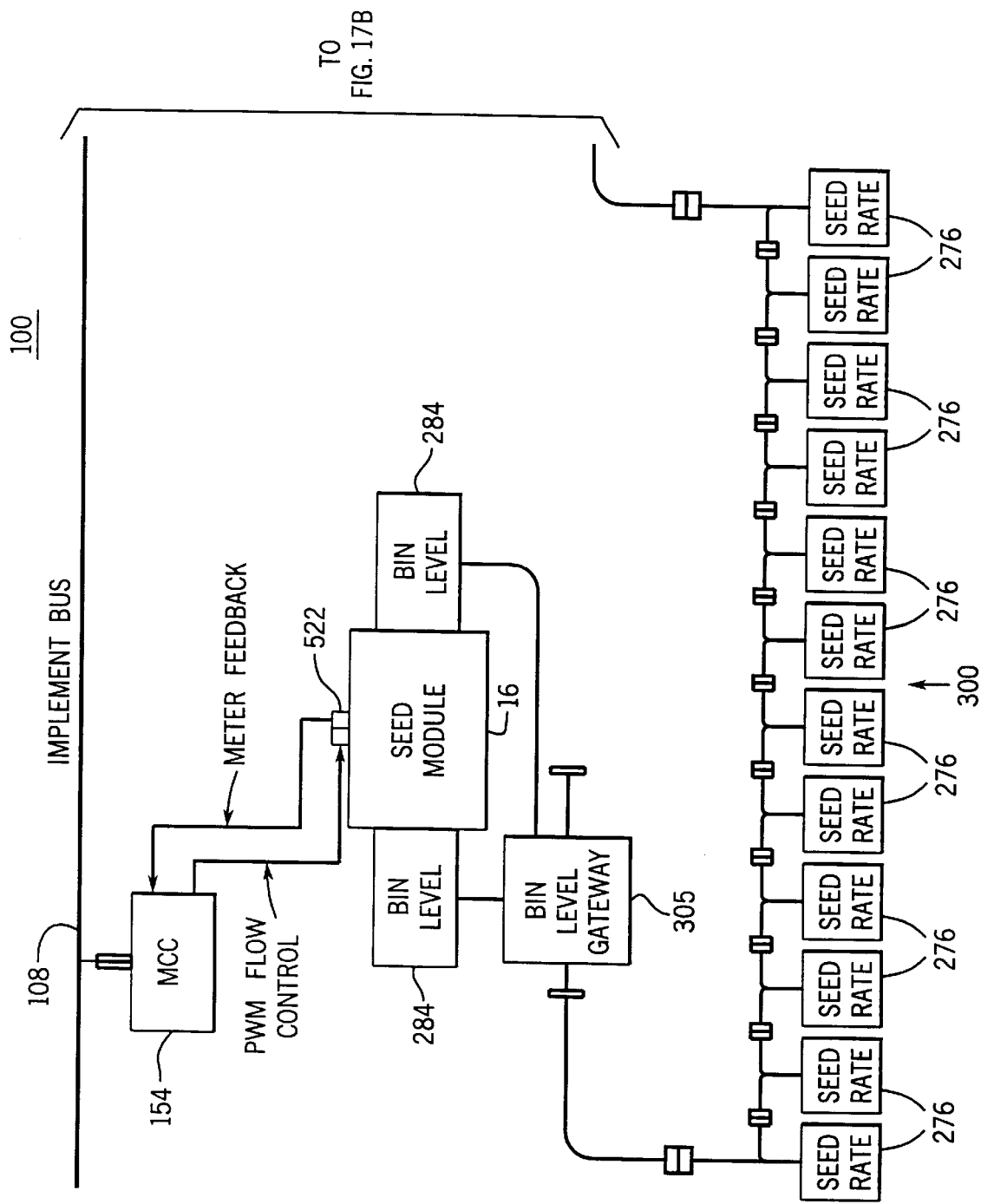
FIG. 17 is a block diagram of a control system for a conventional drill as in FIG. 9 which further includes local MCCs to control the seed rates of each section.
Figure 17B:
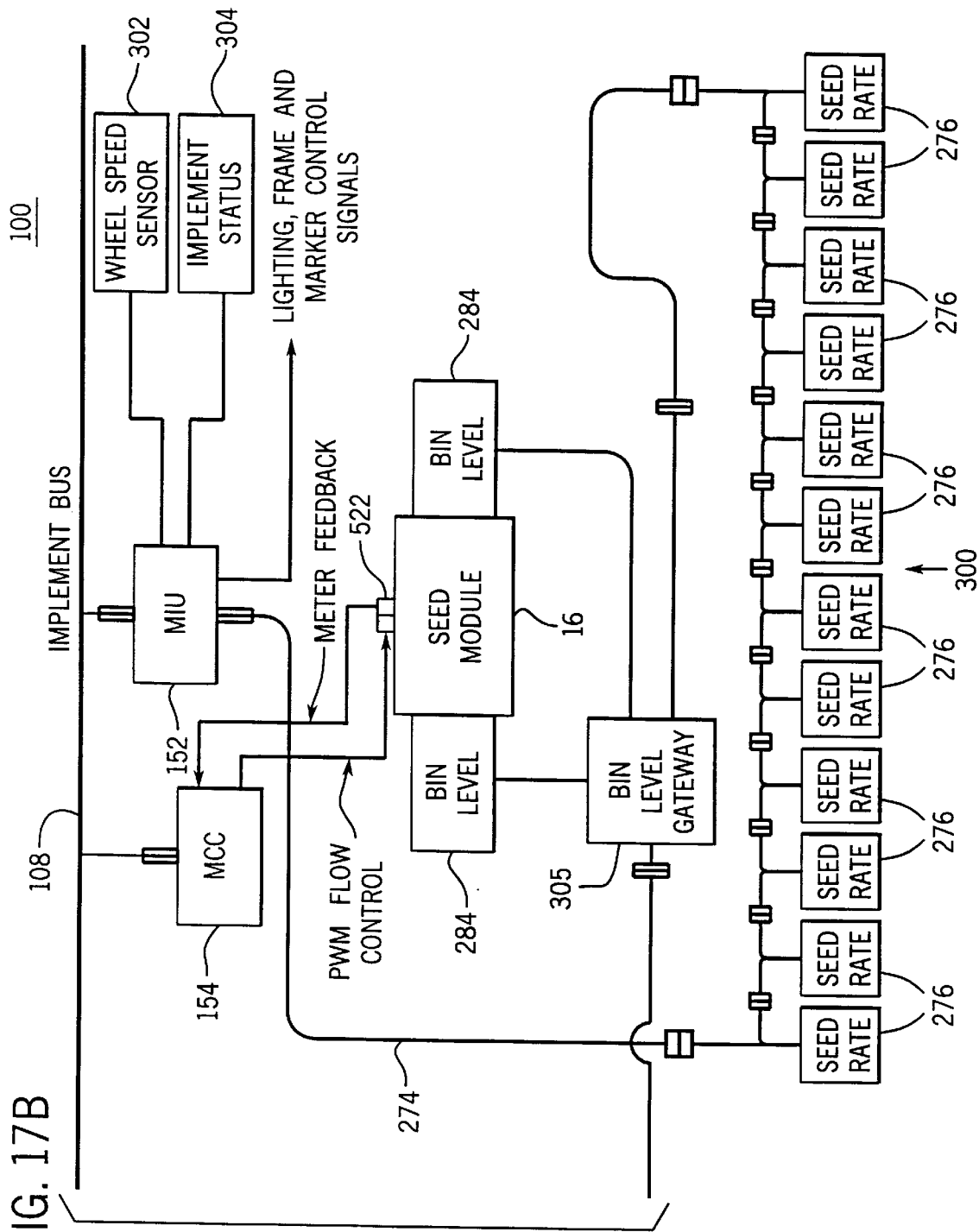

Referring to FIG. 17, another embodiment of control system 100 controls a conventional drill. In contrast to the control system of FIG. 9, however, MCCs 154 control the rates at which seeds are applied by the sections 300 using seed rate command signals received from CDU 140. Each MCC 154 converts the rate command signals into rate control signals which are applied to a seed meter 522 on each seed module 16. MCCs 154 receive feedback speed signals from meter 522, and communicate meter speed data back to CDU 140 for display. MCCs 154 can also use the speed feedback signals for closed-loop metering control.

Figure 18:
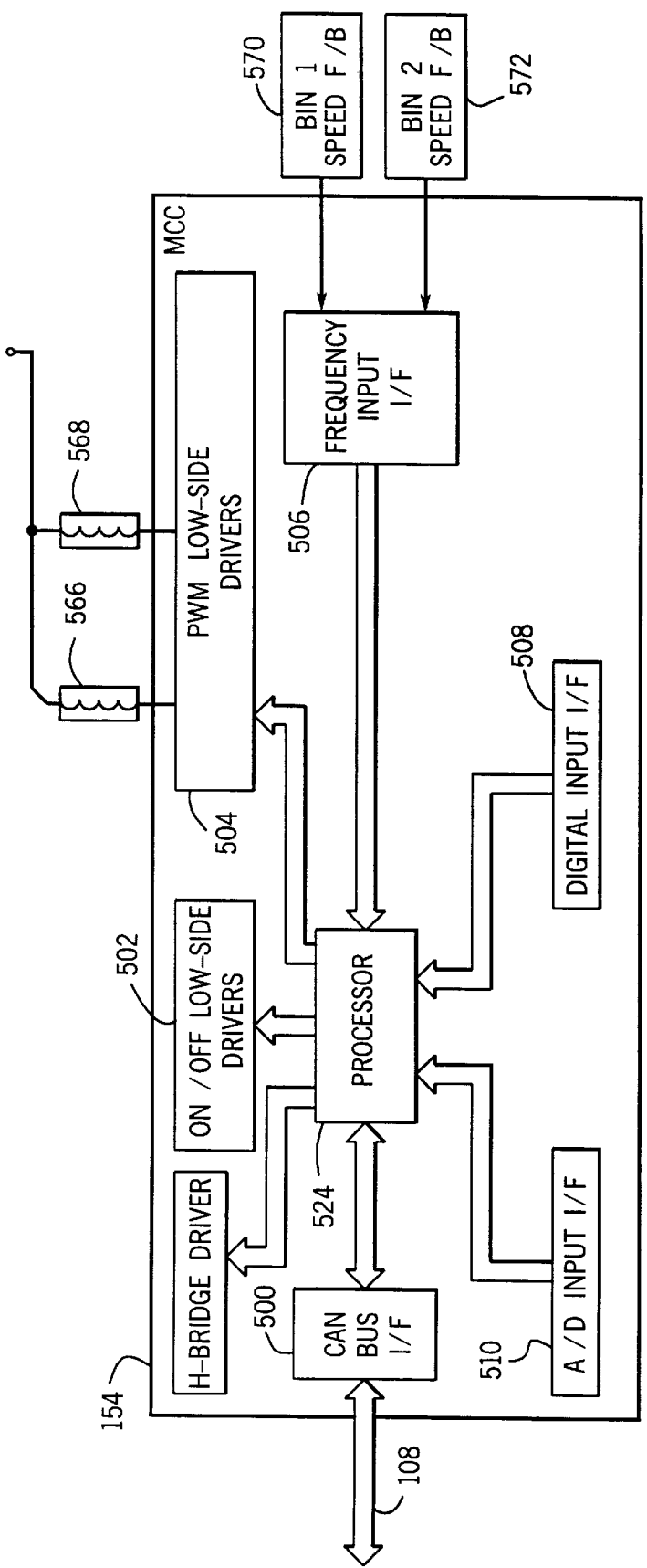
FIG. 18 is an electrical block diagram showing the MCC and the interfaces between the MCC and the metering systems (bins 1 and 2) of the drill shown in FIG. 17.

Referring to FIG. 18, when installed, each local MCC 154 controls product application rates for one section 300 of the conventional drill. Commands for each product being applied are received by MCC processor 524 from CDU 140. Based on the commands, drivers 504 are commanded to generate PWM control signals which are applied to metering device solenoids 566 and 568 for bins 1 and 2. Solenoids 566 and 568 control valves configured to supply fluid to hydraulic motors which dispense seeds from bins. Feedback signals are received from bin 1 and bin 2 meter speed sensors 570 and 572. These signals are sent to CDU 140 for display, or can be used for closed-loop control.

Figure 19A:
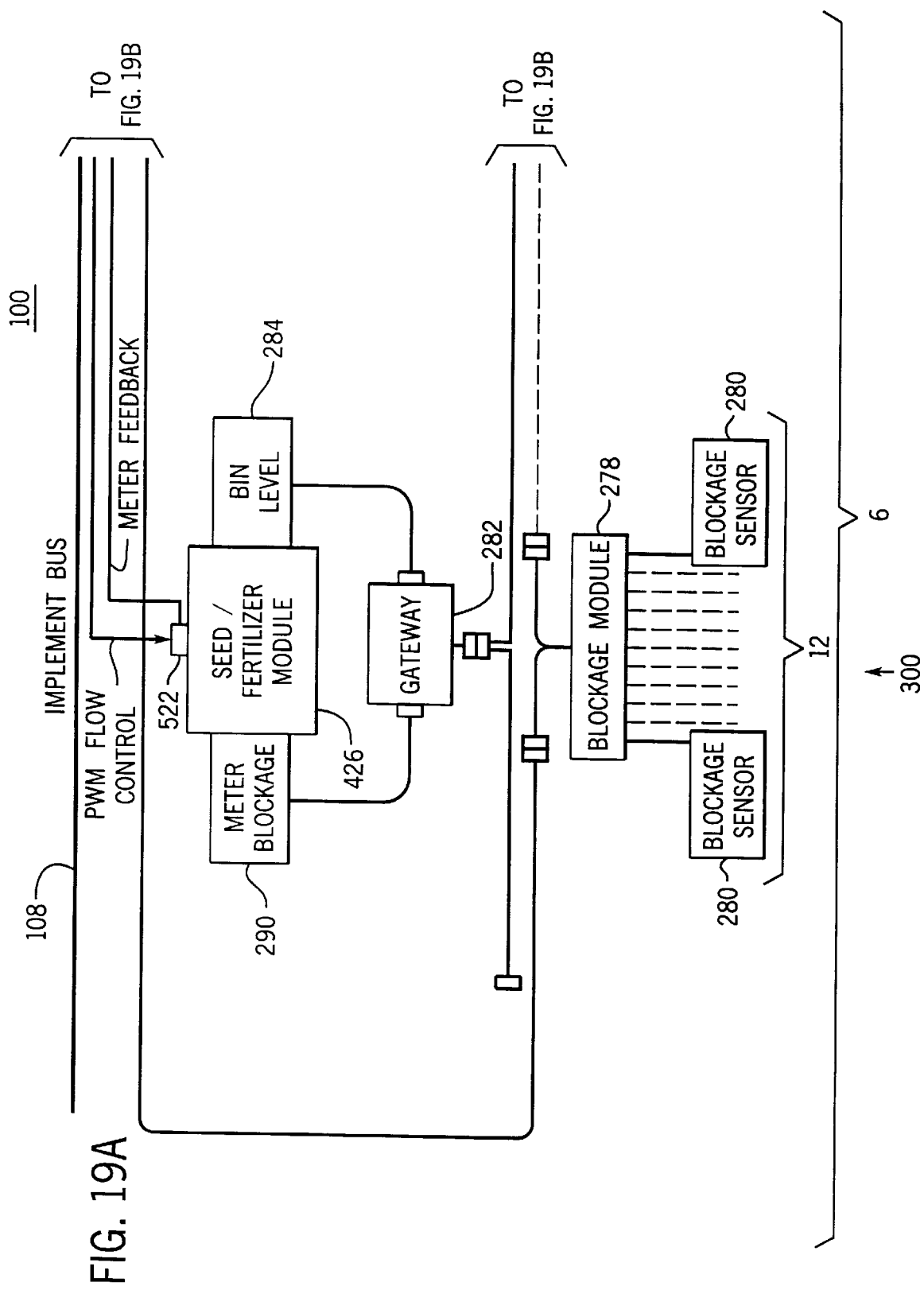
FIG. 19 is a block diagram of a control system for an air drill as in FIG. 11 (e.g., Concord air drill) further including a local MCC to control the seed rates of the implement sections.
Figure 19C:
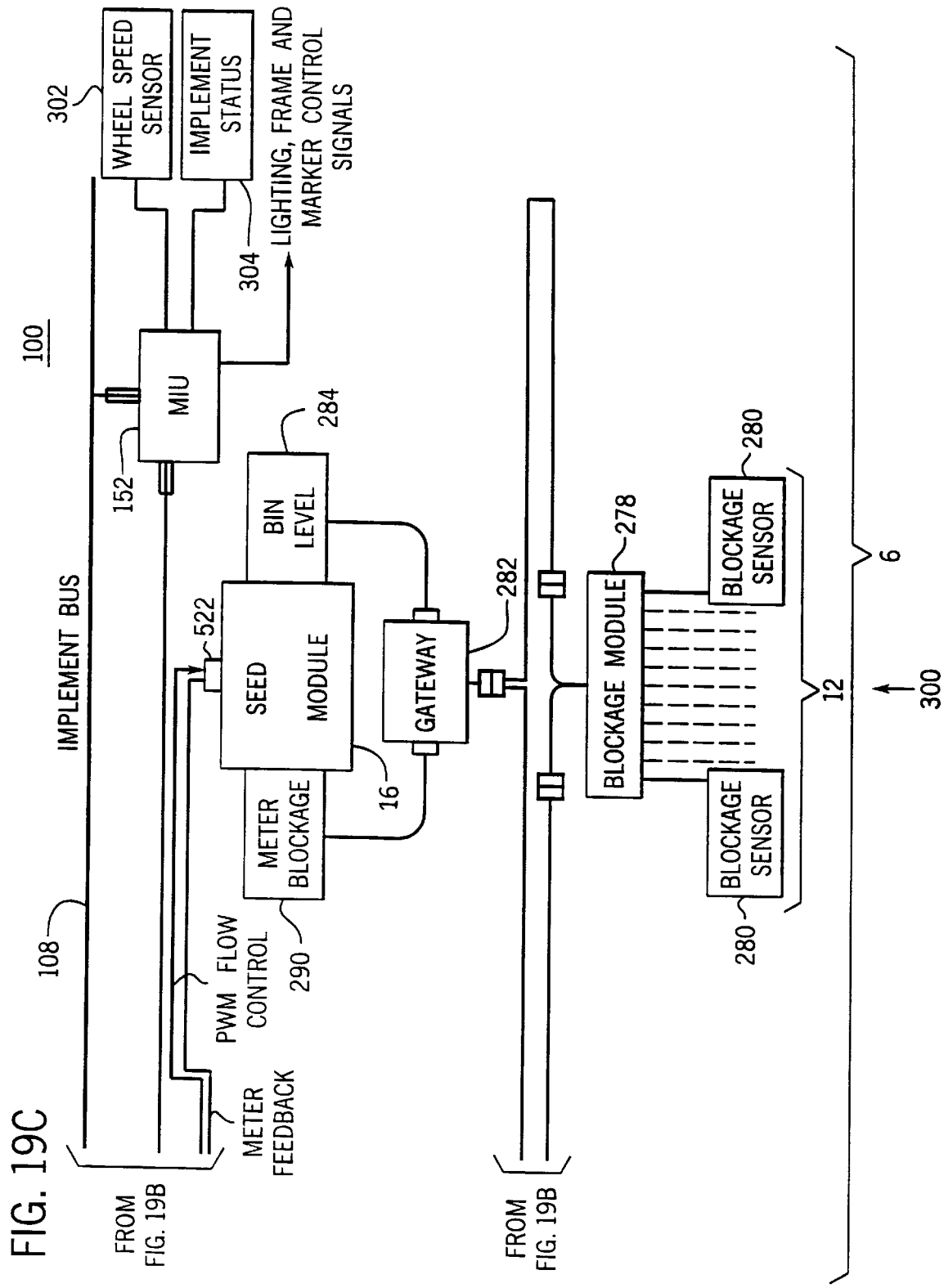

Referring to FIG. 19, another embodiment of control system 100 is configured to control a Concord air drill. In contrast to the control system of FIG. 11, however, a local MCC 154 controls the seed application rates of the implement's six sections 300 based upon seed rate command signals received from CDU 140. MCC 154 converts the rate command signals into control signals applied to meter 522 on seed module 16 or seed/fertilizer module 426. MCC 154 receives feedback speed signals from meter 522, and sends meter speed data back to CDU 140 for display. Feedback signals may also be used for closed-loop control. MCC 154 also applies control signals to fan speed sensor 428, receives speed feedback signals from sensor 428, and communicates fan speed data back to CDU 140 for display.

Figure 20:
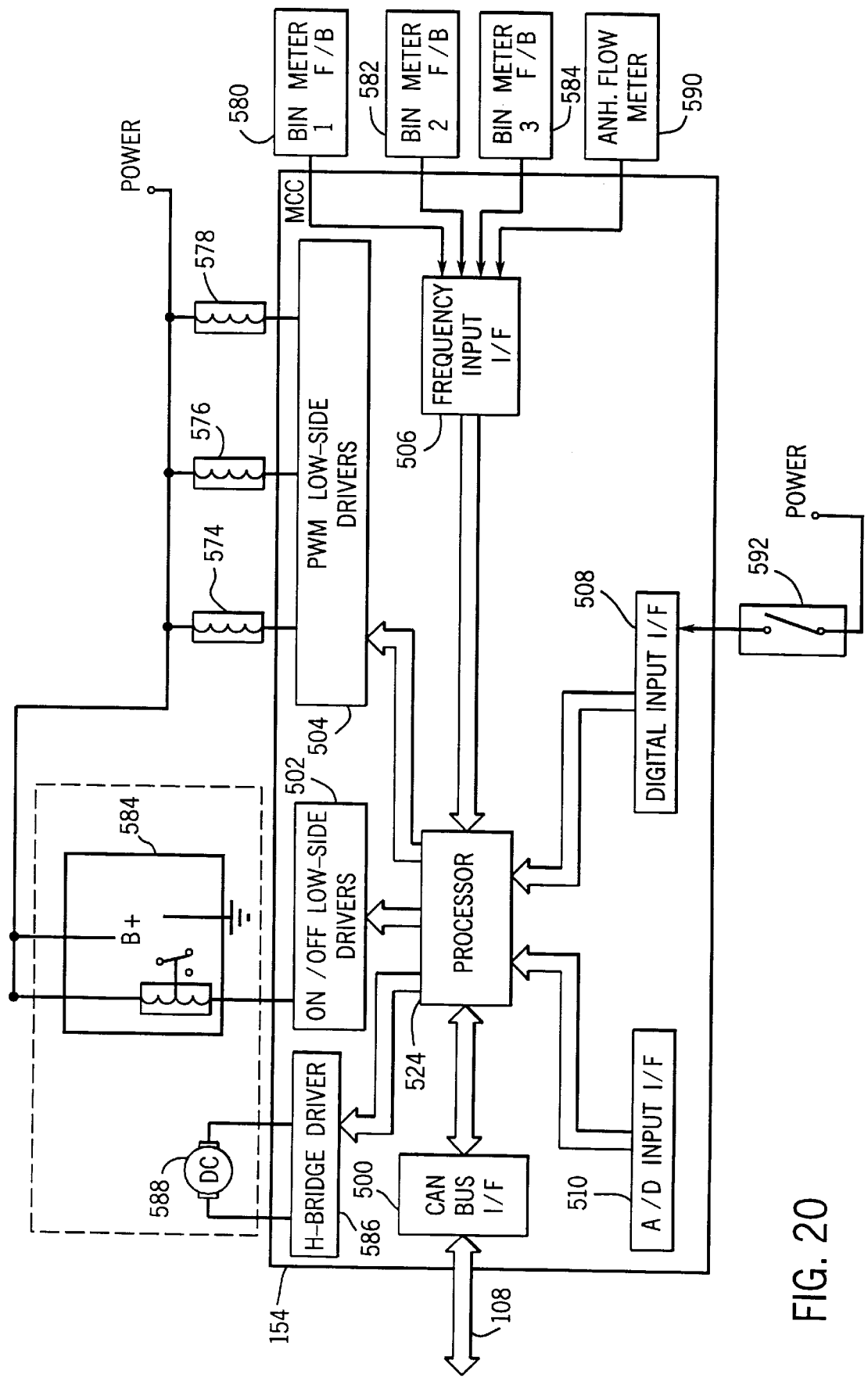
FIG. 20 is an electrical block diagram showing the MCC and the interfaces between the MCC and the metering systems (bins 1–3 and anhydrous) of the drill of FIG. 19 (e.g., Concord air drill).

Referring to FIG. 20, when installed, local MCC 154 controls the product application rates for the air drill. Commands for each product being applied are received by MCC processor 524 from CDU 140. Processor 524 commands drivers 504 based on the commands to generate PWM control signals applied to bin 1, bin 2 and bin 3 metering device solenoids 574–578. Solenoids 574–578 control hydraulic valves configured to supply fluid to motors to dispense seeds or seeds/fertilizer from bins. Feedback signals are received from bin 1, 2 and 3 meter speed sensors 580–584. Processor 524 further controls a relay circuit 584 which applies power to an anhydrous control valve. An H-bridge driver 586 drives an anhydrous flow control valve 588, and feedback signals are provided by a sensor 590. A switch 592 is provided to turn on and off the flow.

While the embodiments illustrated in the FIGURES and described above are presently preferred, it should be understood that these embodiments are offered by way of example only. The control system disclosed herein may be modified for use on other planters, conventional or air drills, other planting implements with variable-rate control, controlled plows, balers, material spreaders and other electronically-controlled implements. The present invention is not intended to be limited to any particular embodiment, but is intended to extend to modifications that nevertheless fall within the scope of the claims.

What is claimed is:

1. A modular application control system for an agricultural implement including a support structure, a plurality of row units supported by the support structure for applying a product to rows in an agricultural field, and a metering device for metering the product to the row units, the system comprising:

a plurality of product sensors for sensing rates at which the product is applied to the rows and for generating product signals representative of the rates;

a first control module capable of being supported by the support structure, coupled to the product sensors, and configured to monitor the product signals representing the rates at which the product is applied to the rows and to generate a multiplexed output signal representative of the product signals; and a second control module capable of being supported by the support structure and configured, when installed, to generate rate control signals in response to rate command input signals and to apply the rate control signals to the metering device to cause the metering device to meter the product to the row units at commanded rates.

2. The system of claim 1 wherein the product sensors include optical sensors configured to detect passage of seeds through seed pathways to the row units.

3. The system of claim 2 wherein the product sensors are coupled to the first control module by a networked sensor bus.

4. The system of claim 1 wherein the implement includes a second metering device for metering a second product, and the second control module is configured to generate second rate control signals in response to second rate command signals and apply the second rate control signals to the second metering device to cause the second metering device to meter the second product to the row units at second commanded rates.

5. The system of claim 4 wherein the first product is seed and the second product is selected from the group consisting of a fertilizer, insecticide and herbicide.

6. The system of claim 1 further comprising a meter status sensor capable of being coupled to the metering device for sensing a parameter of the metering device and for generating meter status signals representative of the parameter.

7. The system of claim 6 wherein the product sensors and the meter status sensor are coupled to the first control module by a networked sensor bus.

8. The system of claim 6 wherein the metering device includes a cyclo seed meter and the meter status sensor includes a meter pressure sensor.

9. The system of claim 6 wherein the metering device receives product from a product bin, and the meter status sensor includes a bin level sensor configured to sense a level of product in the bin.

10. The system of claim 9 wherein the bin level sensor includes a plurality of optical bin level sensors configured to detect a plurality of bin levels.

11. A method of reconfiguring a product application control system for an agricultural implement including a support structure, a plurality of row units coupled to the support structure and configured to apply at least one product to a plurality of rows in a field, and a metering device configured to meter the product to the row units, comprising steps of:

providing a first control module mounted on the support structure and configured to monitor rates at which the product is applied to the rows using signals generated by a plurality of product sensors; and attaching a second control module on the support structure, the second control module being configured to generate rate control signals in response to command signals and to apply the rate control signals to the metering device to cause the metering device to meter the product to the row units at commanded rates.

12. A modular application control system for an agricultural implement coupled to a vehicle, the vehicle including an operator station and the implement including a support structure, a plurality of row units coupled to the support structure for applying a product to a plurality of rows in a field, and a product metering device for metering the product to the row units, the control system comprising:

an implement data bus capable of communicating data between the operator station and the implement;

a display control module capable of being located in the operator station, coupled to the data bus, and including an operator-actuatable command device and a display, the display control module being configured to transmit rate command signals on the data bus in response to actuations of the command device;

a plurality of rate sensors configured to sense at least one rate at which the product is applied to the plurality of rows and generate rate signals representative of the at least one rate at which the product is applied to the plurality of rows;

a first implement control module capable of being supported by the support structure, coupled to the sensors and the data bus, and configured to monitor the at least one rate at which the product is applied to the plurality of rows and to transmit product rate feedback data on the data bus to the display control module, the display control module being configured to display the rate feedback data; and a second implement control module capable of being supported by the support structure, coupled to the data bus, and configured, when installed, to receive the rate command signals from the display control module and to generate rate control signals in response to the rate command signals, and to apply the rate control signals to the product metering device to cause the product metering device to meter the product to the row units at commanded rates.

13. The control system of claim 12 wherein the data bus follows the controller area network (CAN) format.

14. The control system of claim 12 wherein the command device includes a manual rate-setting input device for manually setting the rate command signals.

15. The control system of claim 12 further including a position generator coupled to the display control module and configured to generate positioning signals, wherein the command device generates signals that determine whether the rate command signals depend upon the positioning signals as indices to a geo-referenced rate command map.

16. The control system of claim 12 wherein the plurality of sensors include optical sensors configured to detect passage of seeds through seed pathways.

17. The control system of claim 16 wherein the plurality of sensors are coupled to the first implement control module by a networked sensor bus.

18. The control system of claim 12 wherein the implement further includes a second product metering device configured to meter a second product and the display control module further transmits second rate command signals on the bus, the second implement control module further configured, when installed, to generate second rate control signals in response to the second rate command signals and to apply the second rate control signals to the second metering device to cause the second metering device to meter the second product to the row units at second commanded rates.

19. A kit for providing variable-rate control of a product when used in combination with a control system for an agricultural implement, the implement including a support structure, a plurality of row units supported by the support structure to apply the product to a plurality of rows in a field, and a metering device to meter the product to the row units, the control system including a plurality of rate sensors for sensing at least one rate at which the product is applied to the rows and for generating rate signals representative of the at least one rate at which the product is applied to the rows, a meter status sensor coupled to the metering device for sensing a parameter of the metering device and for generating meter status signals representative of the parameter, and a monitoring control module coupled to the rate sensors and meter status sensor and configured to monitor the at least one rate at which the product is applied and the parameter of the metering device, the kit comprising:

a control module capable of being removably supported by the support structure, capable of being coupled to the metering device, and configured to generate rate control signals in response to rate command signals and to apply the rate control signals to the metering device to cause the metering device to meter the product at rates corresponding to the rate command signals.

20. The kit of claim 19 further comprising a meter feedback sensor capable of being coupled to the metering device for generating a meter feedback signal, wherein the control module uses the feedback signal for closed-loop control.

* * * * *